United States Patent
Ueno et al.

(10) Patent No.: US 8,700,703 B2
(45) Date of Patent: Apr. 15, 2014

(54) CONTENTS SERVER AND CONTENTS SERVER SYSTEM

(75) Inventors: Takashi Ueno, Kawasaki (JP);
Kazutoshi Kobayashi, Kawasaki (JP);
Hironobu Oshika, Kawasaki (JP);
Shouichi Kimura, Kawasaki (JP);
Tadaaki Tanaka, Kawasaki (JP);
Takashi Kaneko, Kawasaki (JP);
Masaaki Nagasaka, Kawasaki (JP);
Keita Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 800 days.

(21) Appl. No.: 11/801,064

(22) Filed: May 8, 2007

(65) Prior Publication Data

US 2007/0214217 A1 Sep. 13, 2007

Related U.S. Application Data

(63) Continuation of application No. PCT/JP2005/005938, filed on Mar. 29, 2005.

(30) Foreign Application Priority Data

Nov. 10, 2004 (WO) .................. PCT/JP2004/016670

(51) Int. Cl.
*G06F 15/16* (2006.01)

(52) U.S. Cl.
USPC ........... 709/204; 709/206; 709/224; 709/226; 709/231

(58) Field of Classification Search
USPC ................ 709/204, 207; 713/152; 379/202.1; 455/416, 417
See application file for complete search history.

(56) References Cited

U.S. PATENT DOCUMENTS

| | | | | |
|---|---|---|---|---|
| 5,323,445 A | * | 6/1994 | Nakatsuka | 348/14.09 |
| 5,933,780 A | * | 8/1999 | Connor et al. | 455/519 |
| 6,987,847 B1 | * | 1/2006 | Murphy et al. | 379/201.1 |
| 7,418,090 B2 | * | 8/2008 | Reding et al. | 379/202.01 |
| 2002/0150091 A1 | | 10/2002 | Lopponen et al. | |
| 2003/0028662 A1 | * | 2/2003 | Rowley et al. | 709/231 |
| 2003/0097407 A1 | | 5/2003 | Litwin et al. | |

(Continued)

FOREIGN PATENT DOCUMENTS

| | | |
|---|---|---|
| JP | 11-168497 | 6/1999 |
| WO | WO 02/085051 | 10/2002 |
| WO | WO 02085051 A1 * | 10/2002 |
| WO | 2004/049608 | 6/2004 |

OTHER PUBLICATIONS

International Search Report dated Jul. 5, 2005 for corresponding International Application PCT/JP2005/005938.

(Continued)

*Primary Examiner* — Randy Scott
(74) *Attorney, Agent, or Firm* — Katten Muchin Rosenman LLP

(57) ABSTRACT

The present invention relates to a communication system, and the invention specifically provides a contents server that appropriately stores media contents from group users in a PoC Service and a conference service. The contents server includes: a recording unit that records media information from plural users in a communicatable state participating in a predetermined group, for each group; a detecting unit that detects a communicatable state or an uncommunicatable state of each participating user, at each predetermined time; and a deleting unit that deletes confirmed media information already recorded in the recording unit, upon detecting that all the participating users are in the communicatable state.

8 Claims, 47 Drawing Sheets

(56) References Cited

U.S. PATENT DOCUMENTS

2003/0101219 A1* 5/2003 Kondo et al. ............... 709/204
2005/0010795 A1* 1/2005 Tagawa et al. ............. 713/193
2006/0031290 A1* 2/2006 Mannaru et al. ........... 709/204
2009/0177743 A1* 7/2009 Ashour et al. .............. 709/204
2009/0296608 A1* 12/2009 Khan et al. ................. 370/260

OTHER PUBLICATIONS

Supplementary European Search Report dated Dec. 20, 2010, from the corresponding European Application.

* cited by examiner

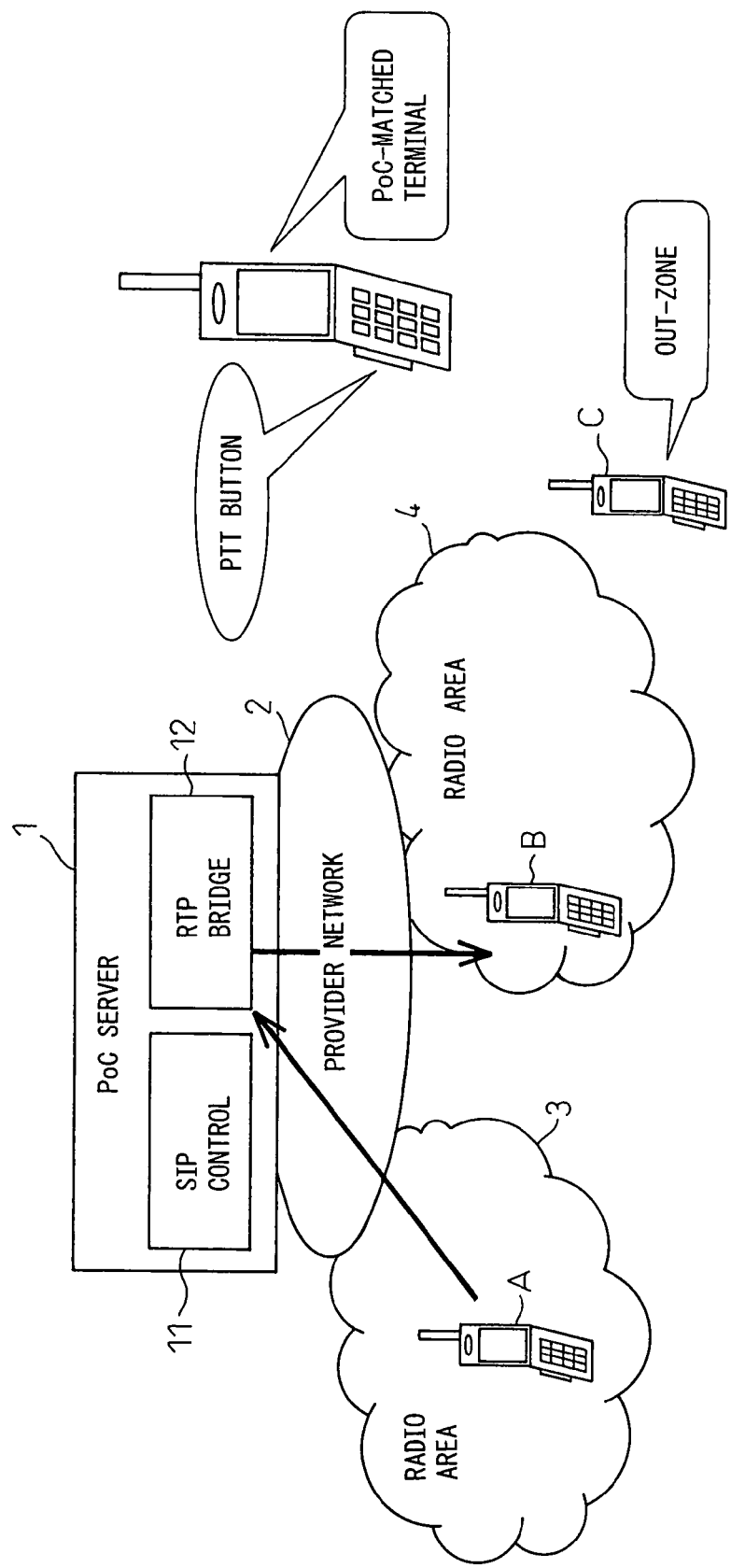

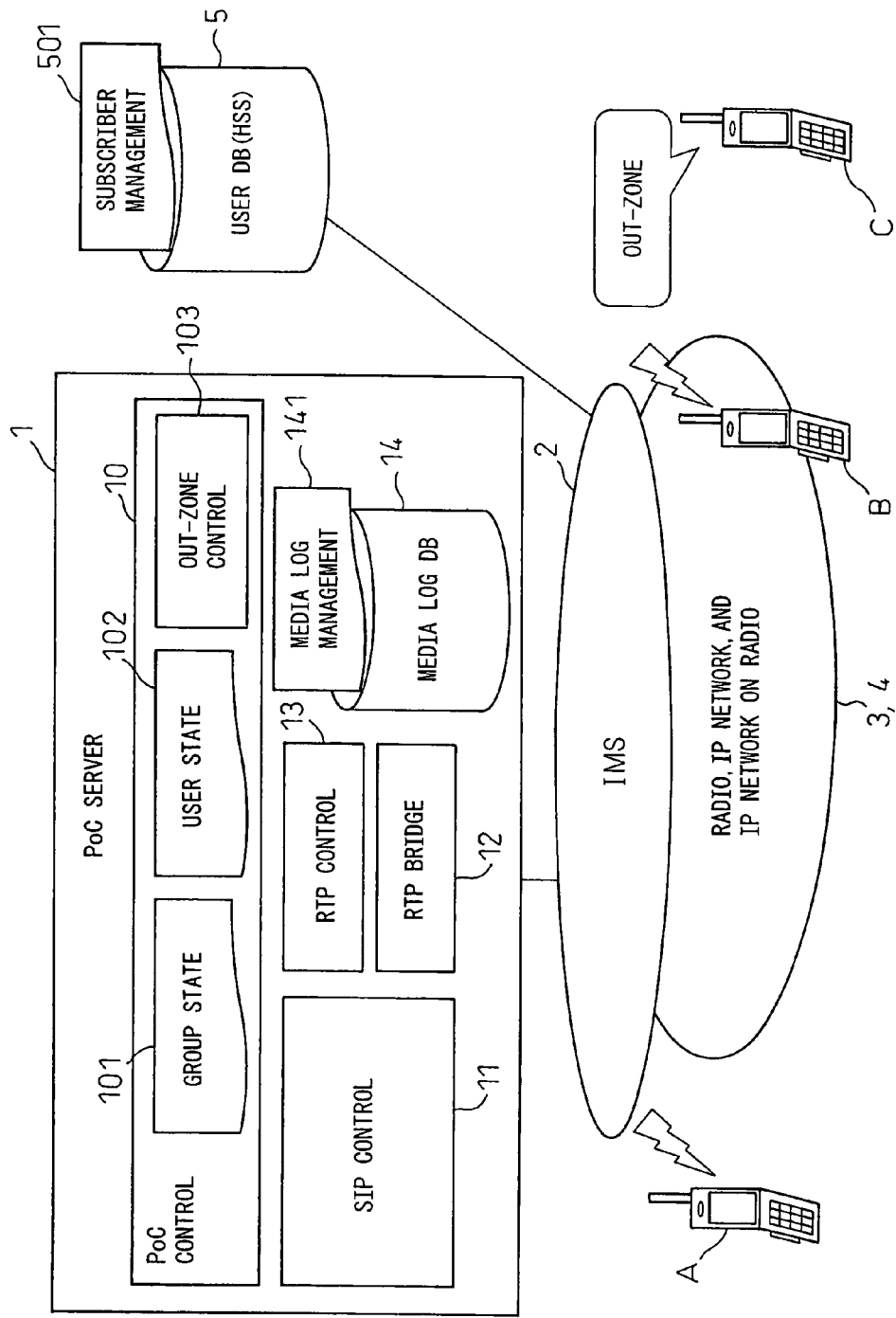

Fig. 3A

SUBSCRIBER MANAGEMENT TABLE

501

| USER | PoC SERVICE | PoC ACCUMULATION | GROUP |
|------|-------------|------------------|-------|
| A | SUBSCRIPTION | SUBSCRIPTION | I, II |
| B | SUBSCRIPTION | SUBSCRIPTION | I |
| C | SUBSCRIPTION | SUBSCRIPTION | I |
| D | SUBSCRIPTION | NONSUBSCRIPTION | III, V |
| E | NONSUBSCRIPTION | NONSUBSCRIPTION | — |

Fig. 3B

GROUP STATE TABLE

101

| GROUP | STATE |
|-------|-------|
| I | GROUP ACTIVE |
| II | INITIAL STATE |
| III | INITIAL STATE |

USER STATE TABLE

| USER | STATE | FINAL CONFIRMATION TIME |
|---|---|---|
| A | INITIAL | — |
| B | IN-ZONE | 10 : 05 |
| C | OUT-ZONE | 9 : 55 |

MEDIA LOG MANAGEMENT TABLE

| GROUP | TRANSMISSION SOURCE | TIME | DATA FILE |
|---|---|---|---|
| I | A | 9 : 45 | ABANDON |
| I | A | 9 : 50 | ABANDON |
| I | B | 9 : 55 | ABANDON |
| I | A | 10 : 00 | DATA 1 |
| I | B | 10 : 05 | DATA 2 |

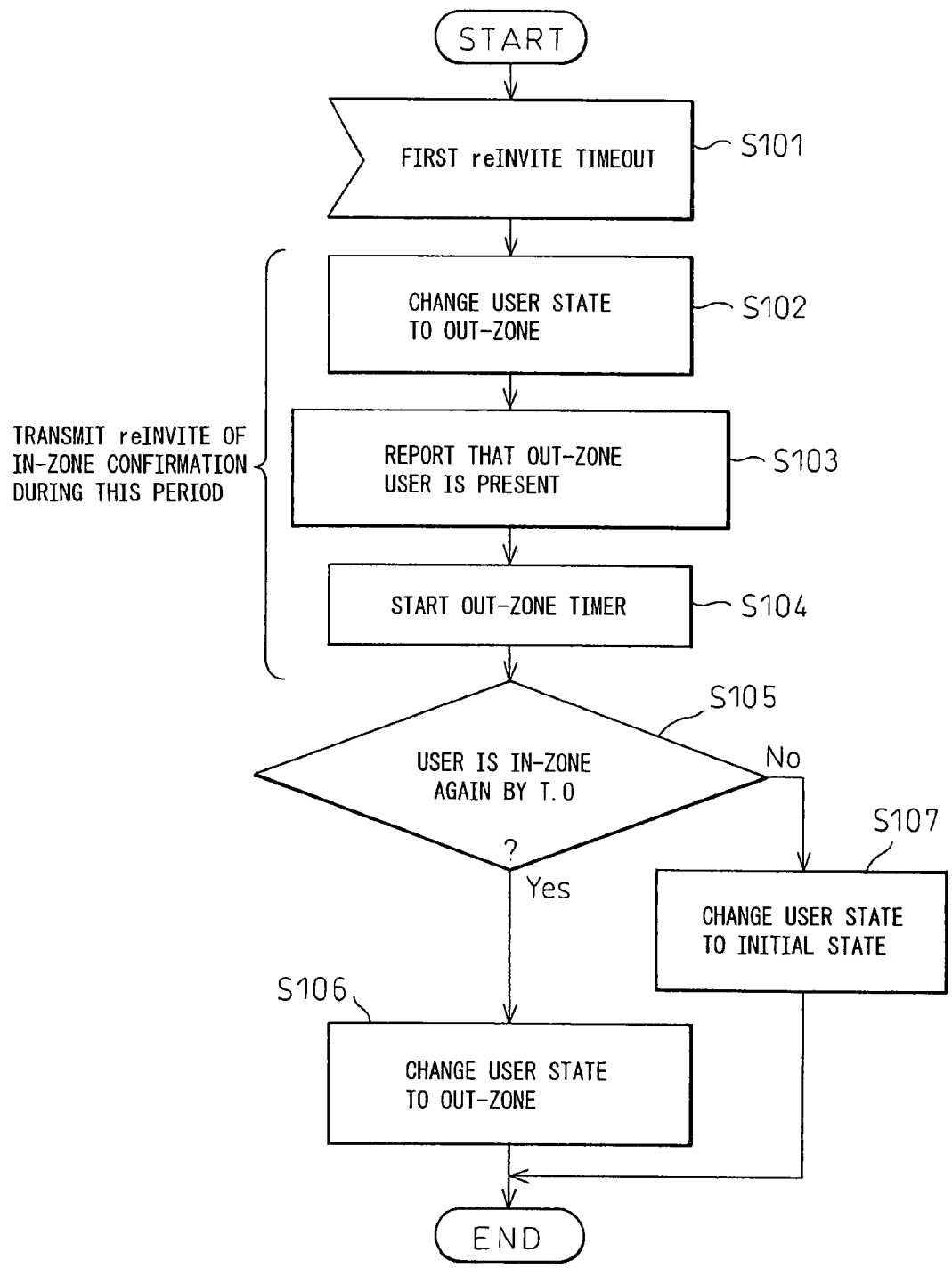

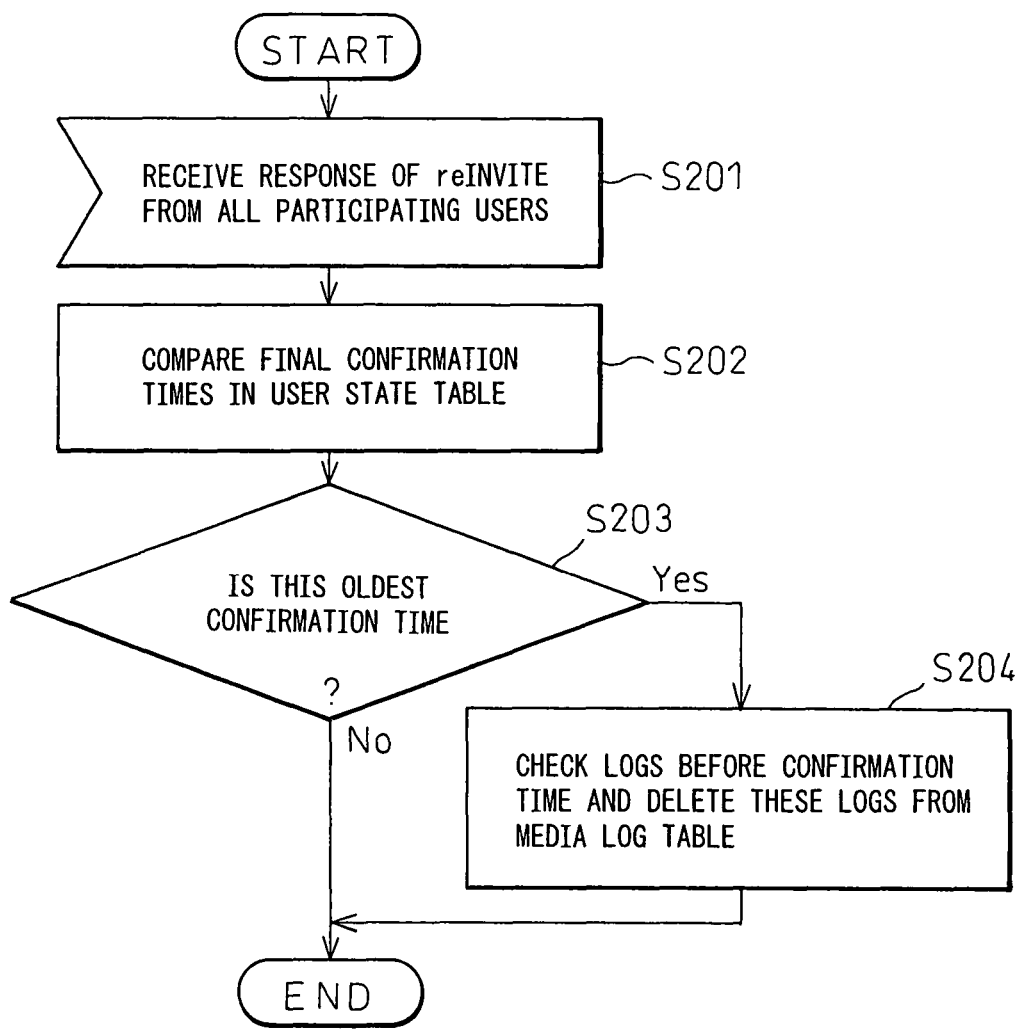

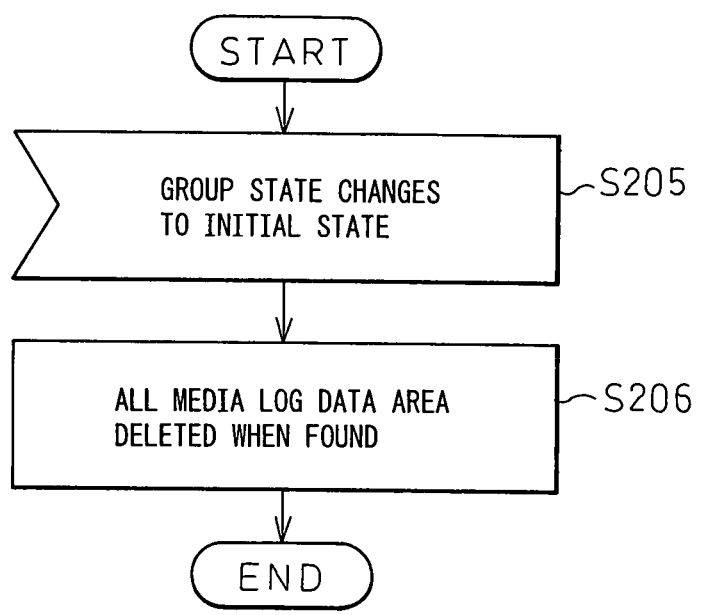

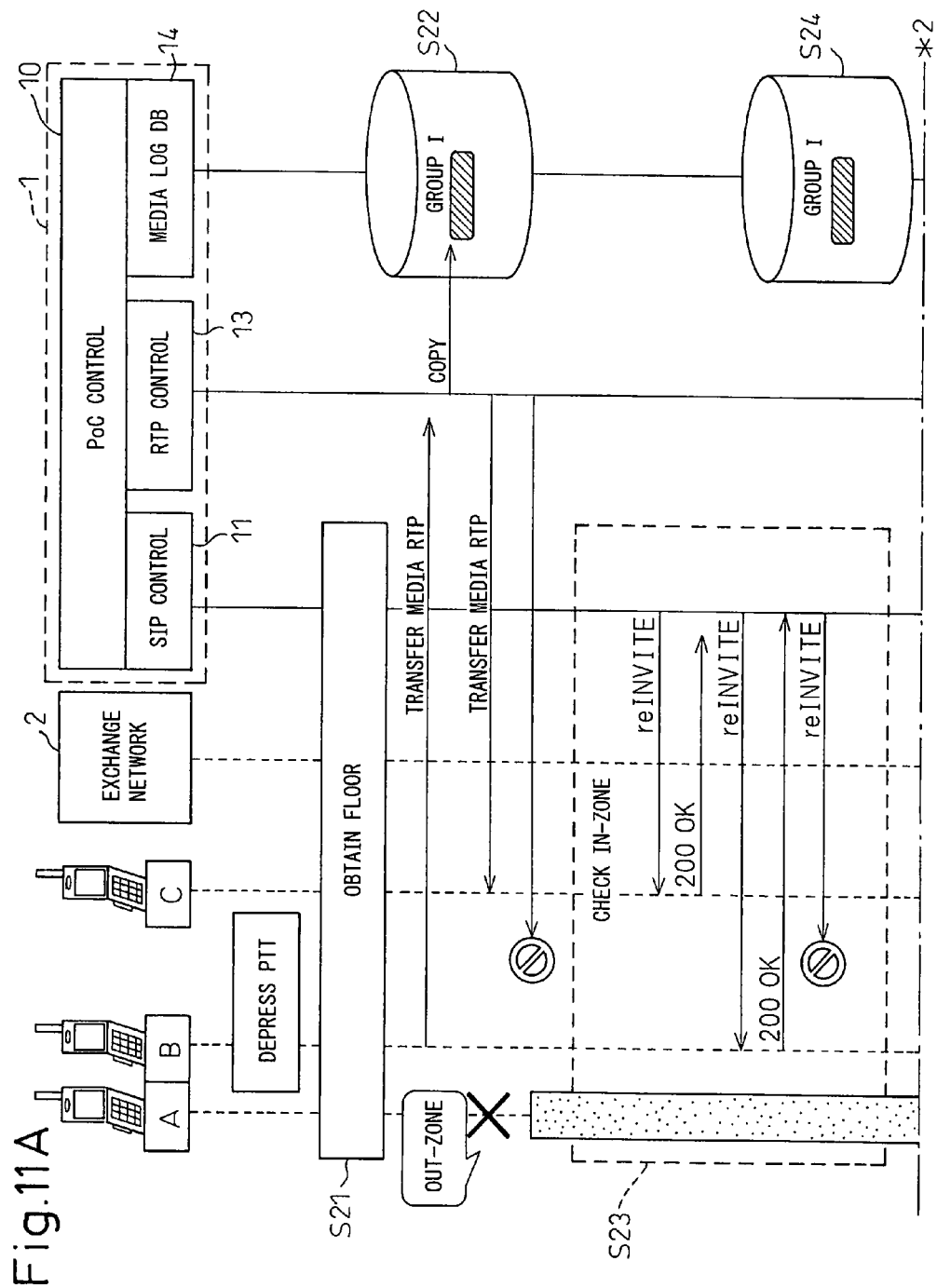

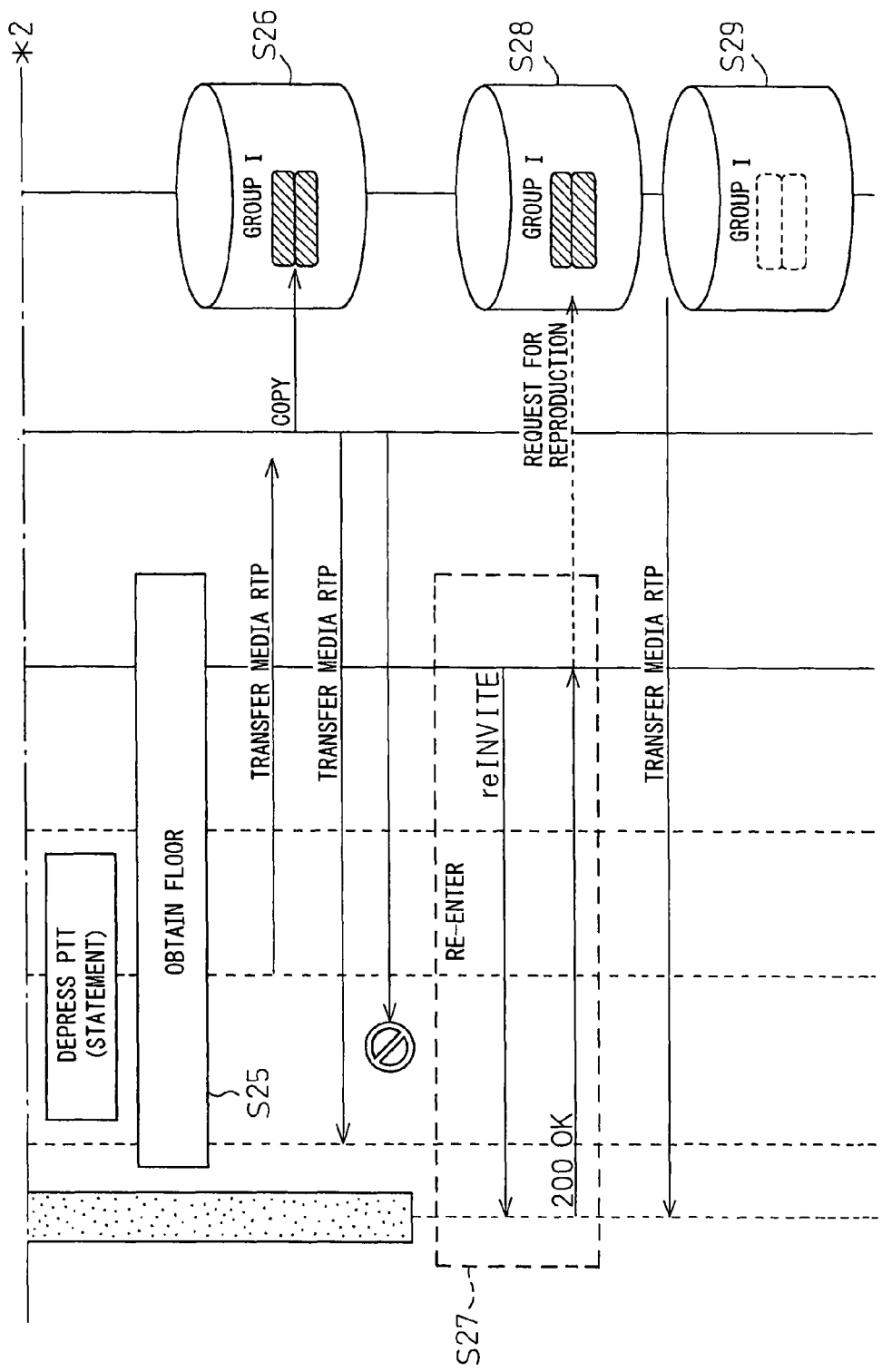

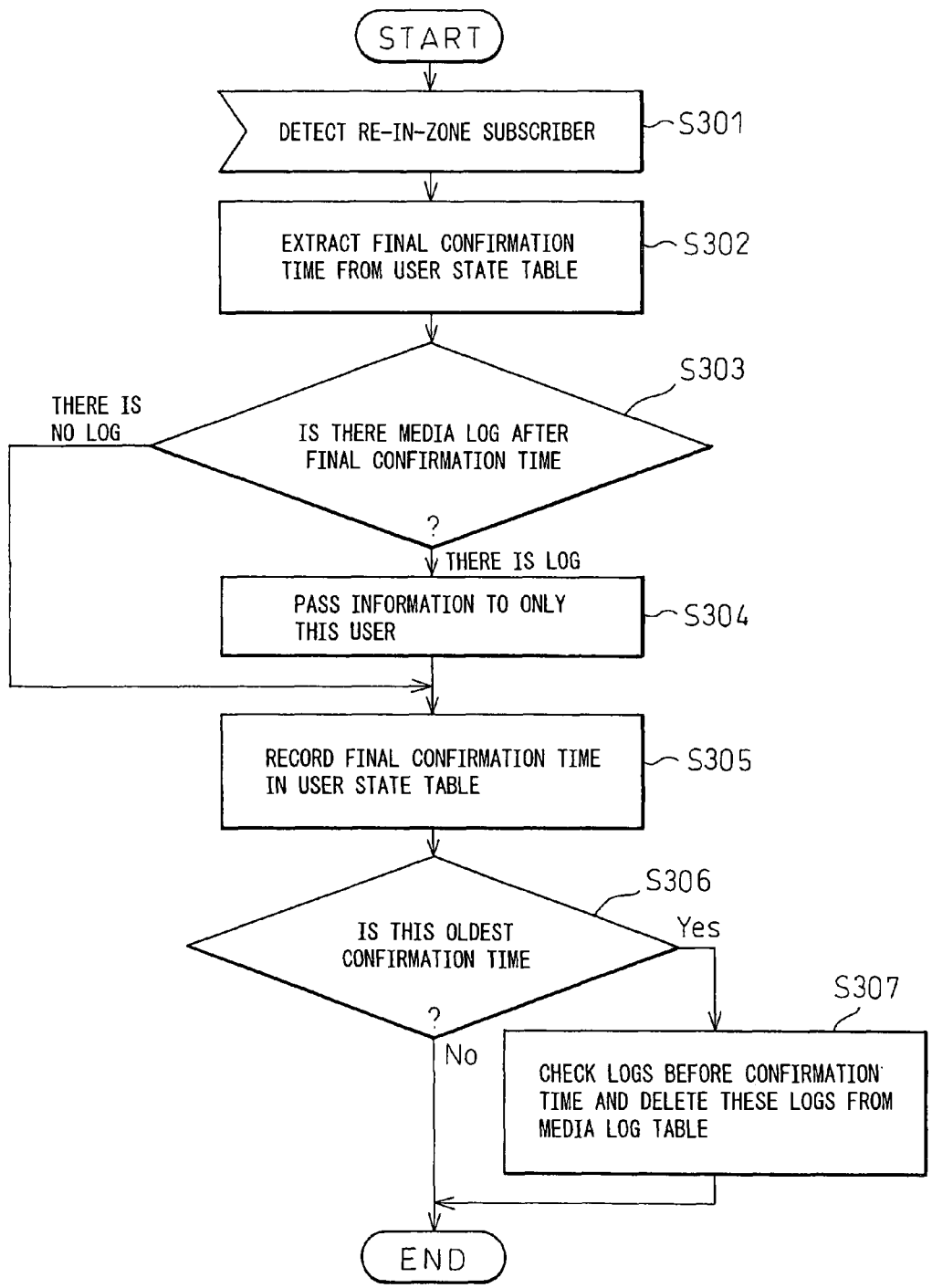

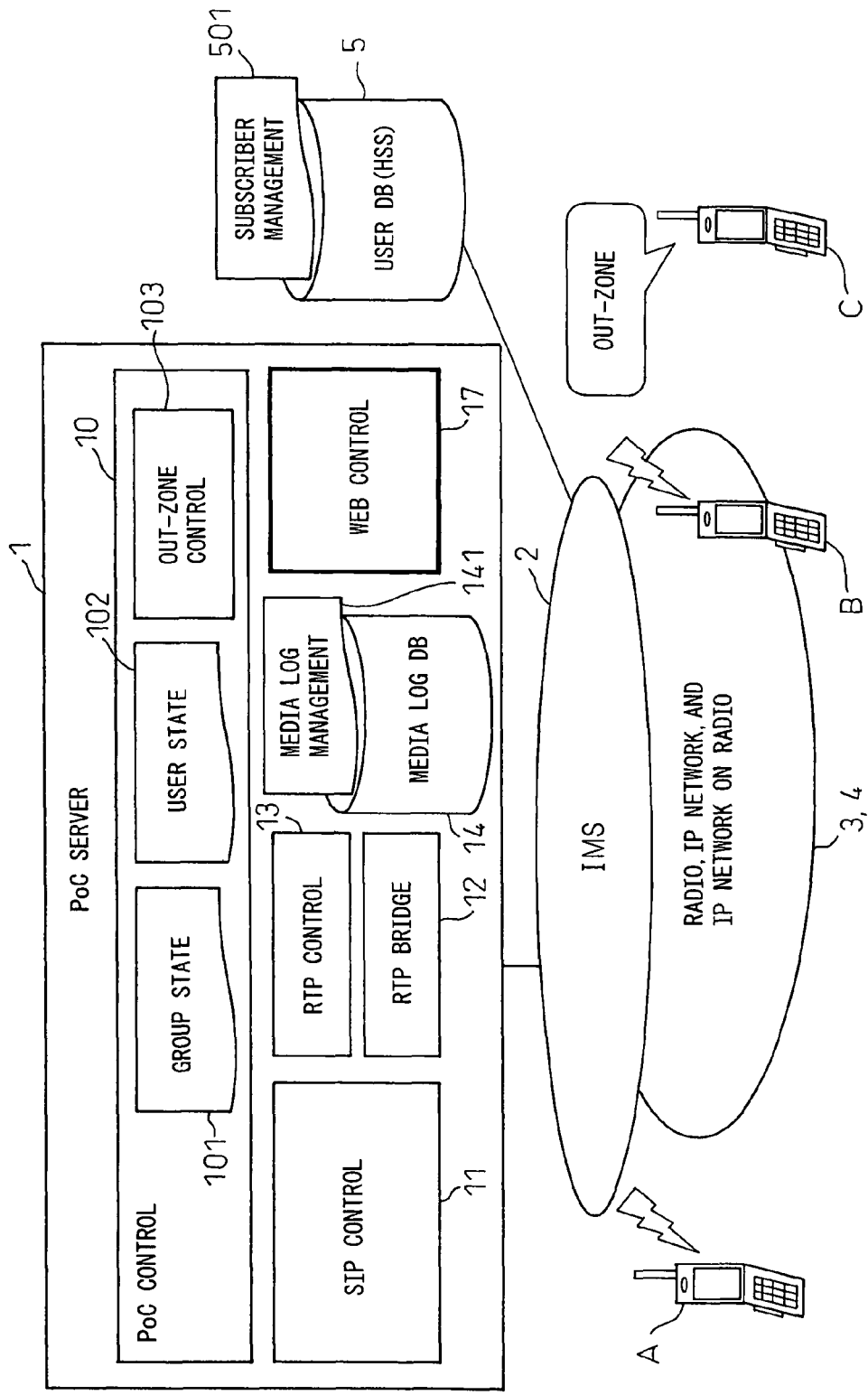

Fig.20

USER STATE TABLE

702

| USER | STATE | FINAL CONFIRMATION TIME |
|------|-------|-------------------------|
| A | INITIAL STATE | — |
| B | IN-ZONE | 10 : 05 |
| C | OUT-ZONE | 9 : 55 |
| D | ABSENCE | 10 : 00 |

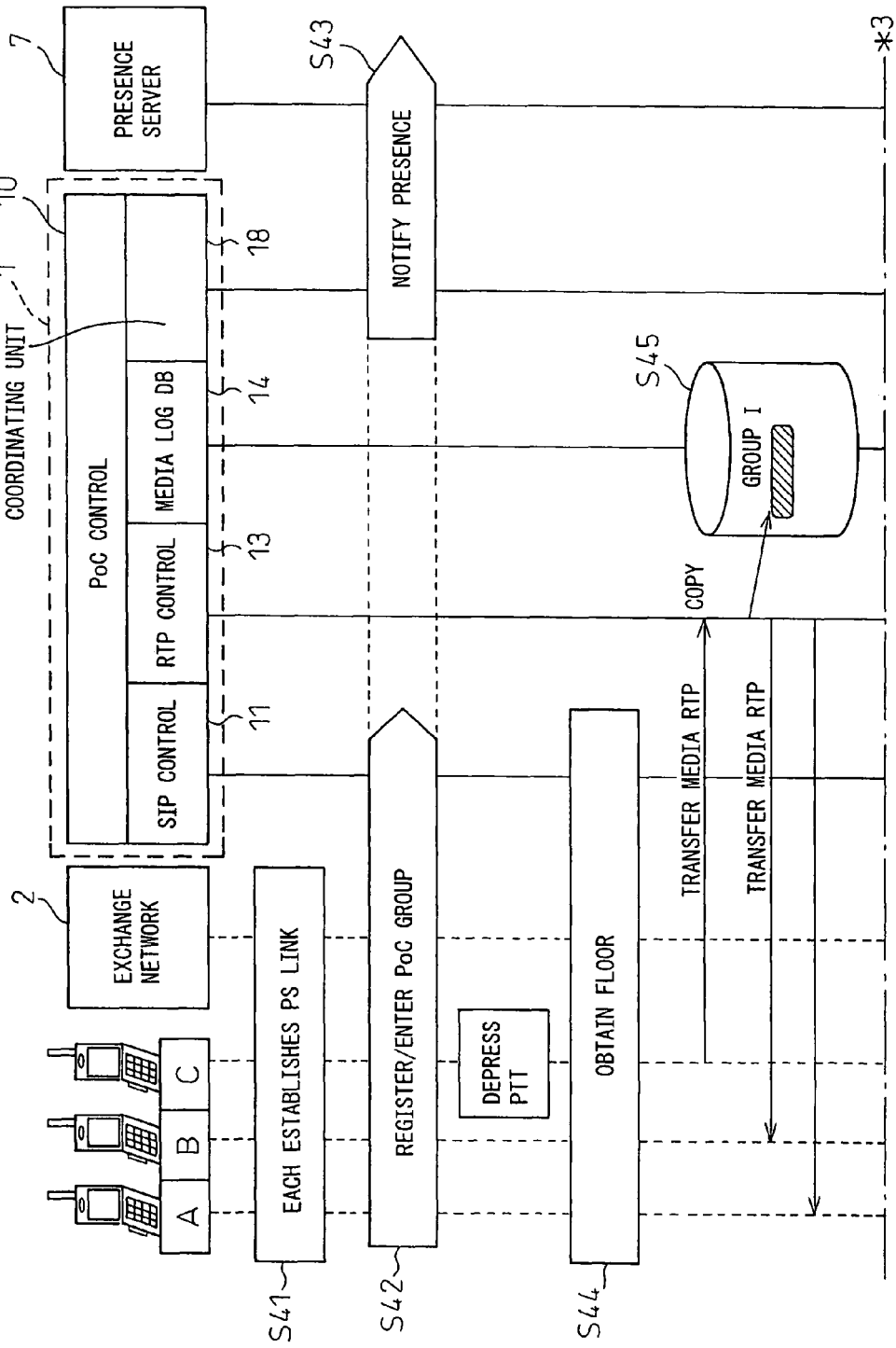

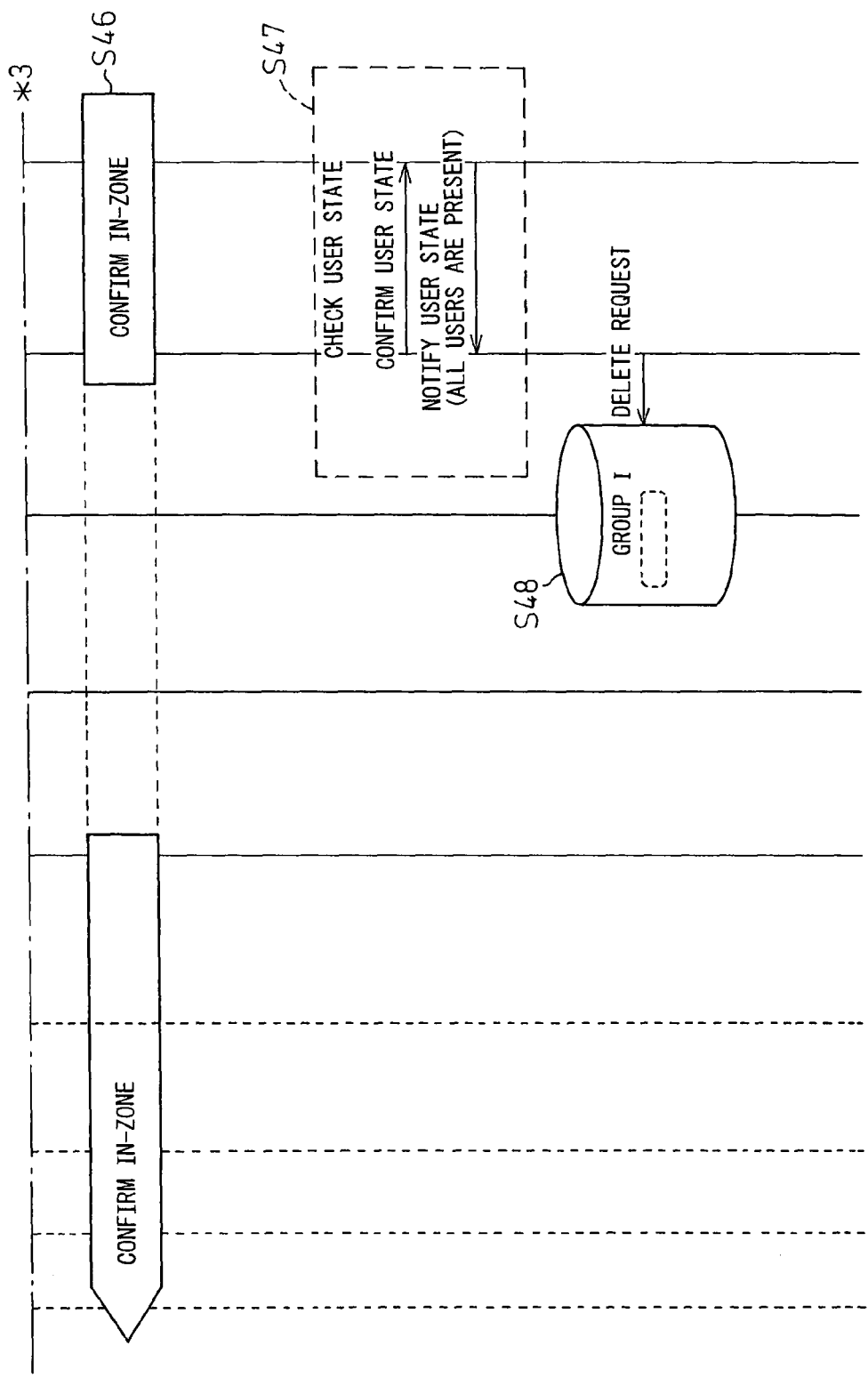

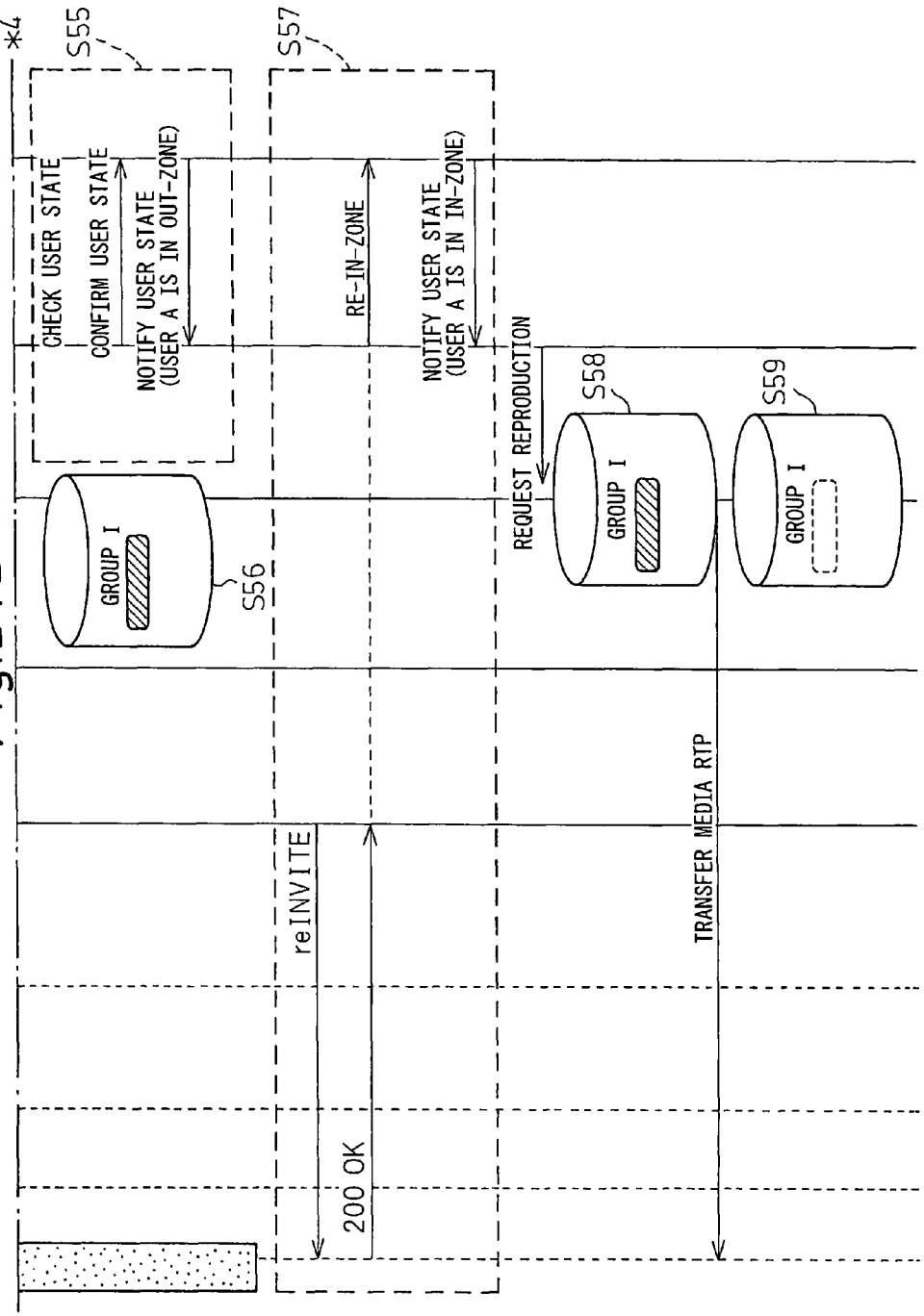

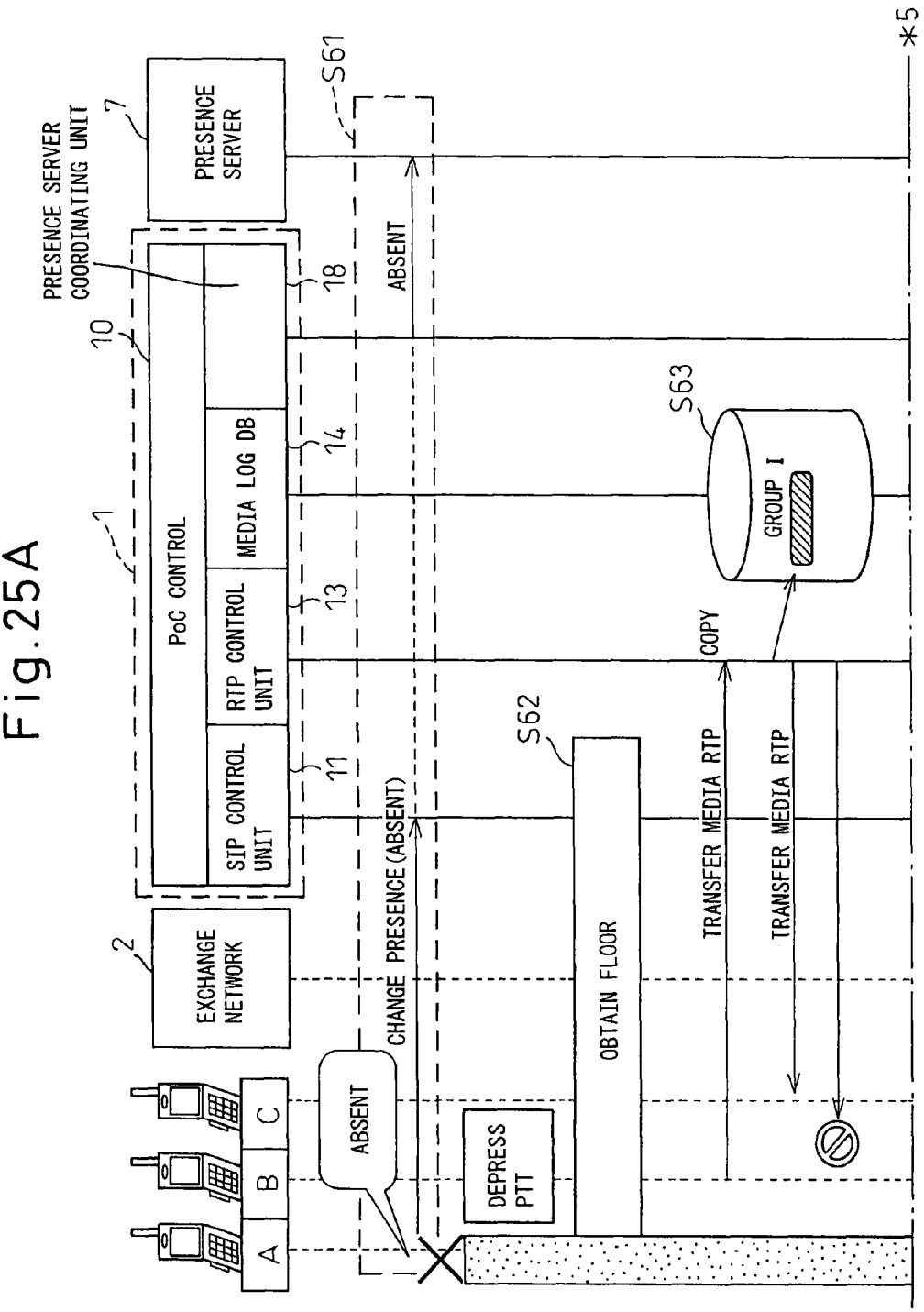

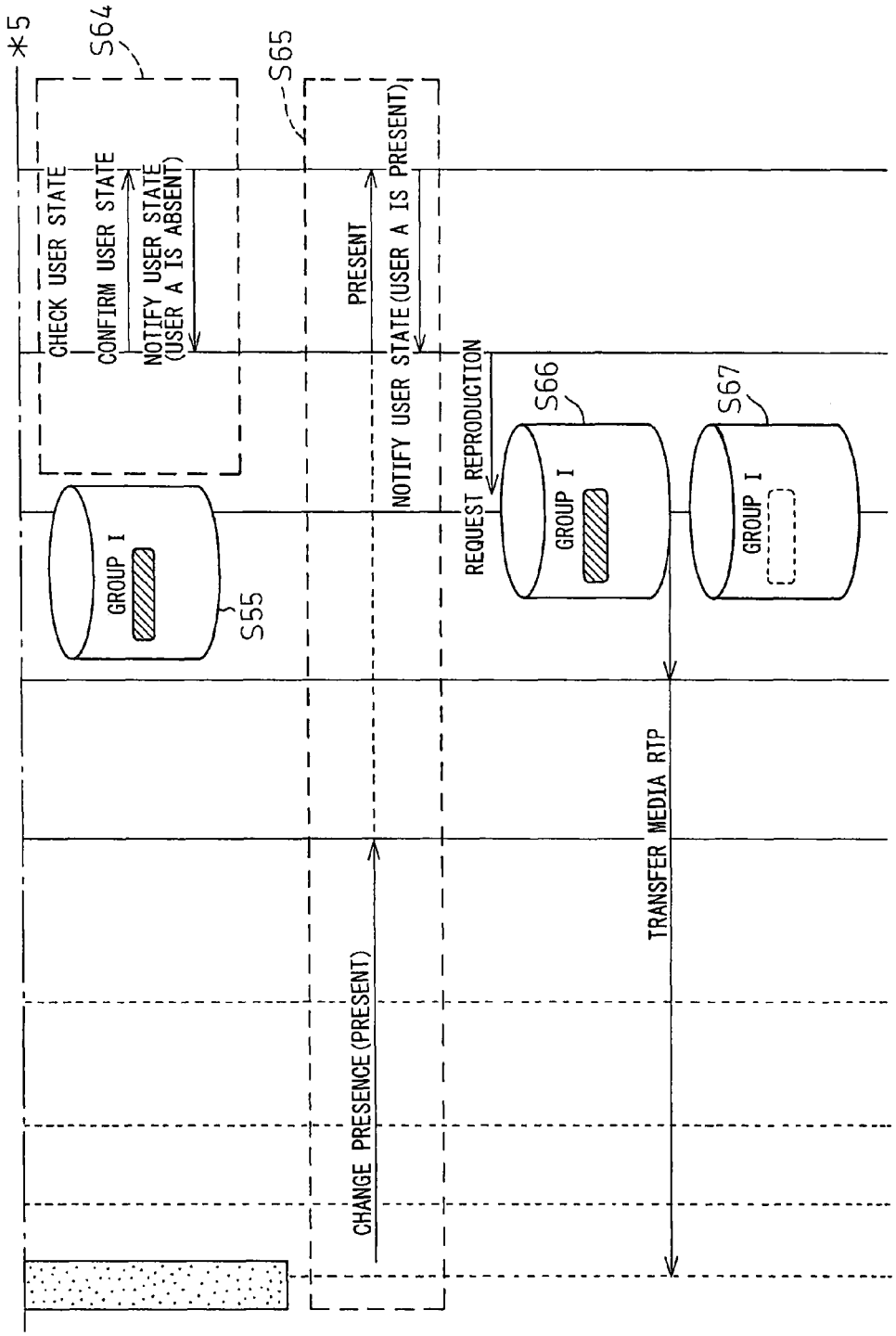

GROUP MANAGEMENT TABLE

SUBSCRIBER NUMBER CORRESPONDENCE TABLE

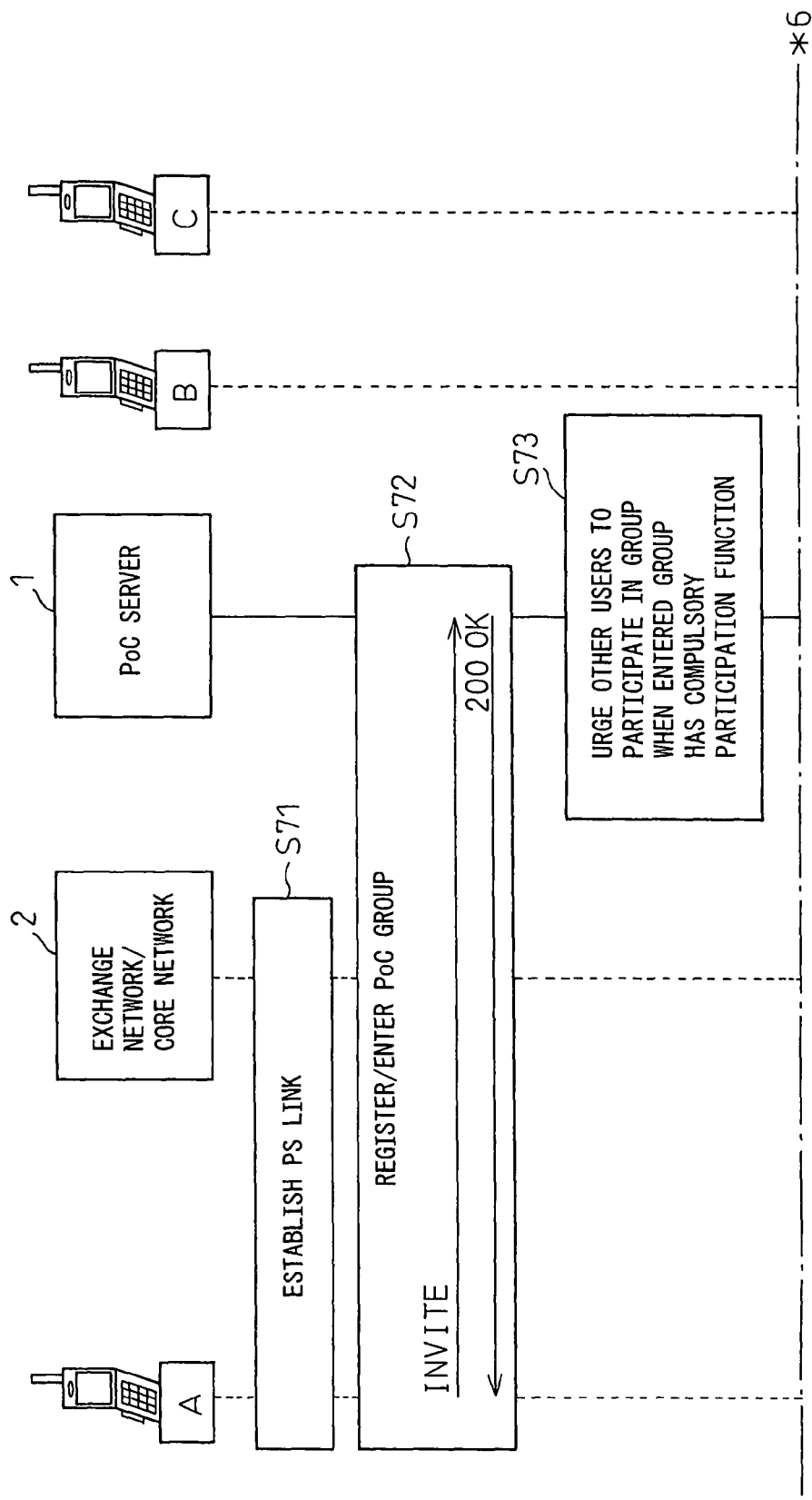

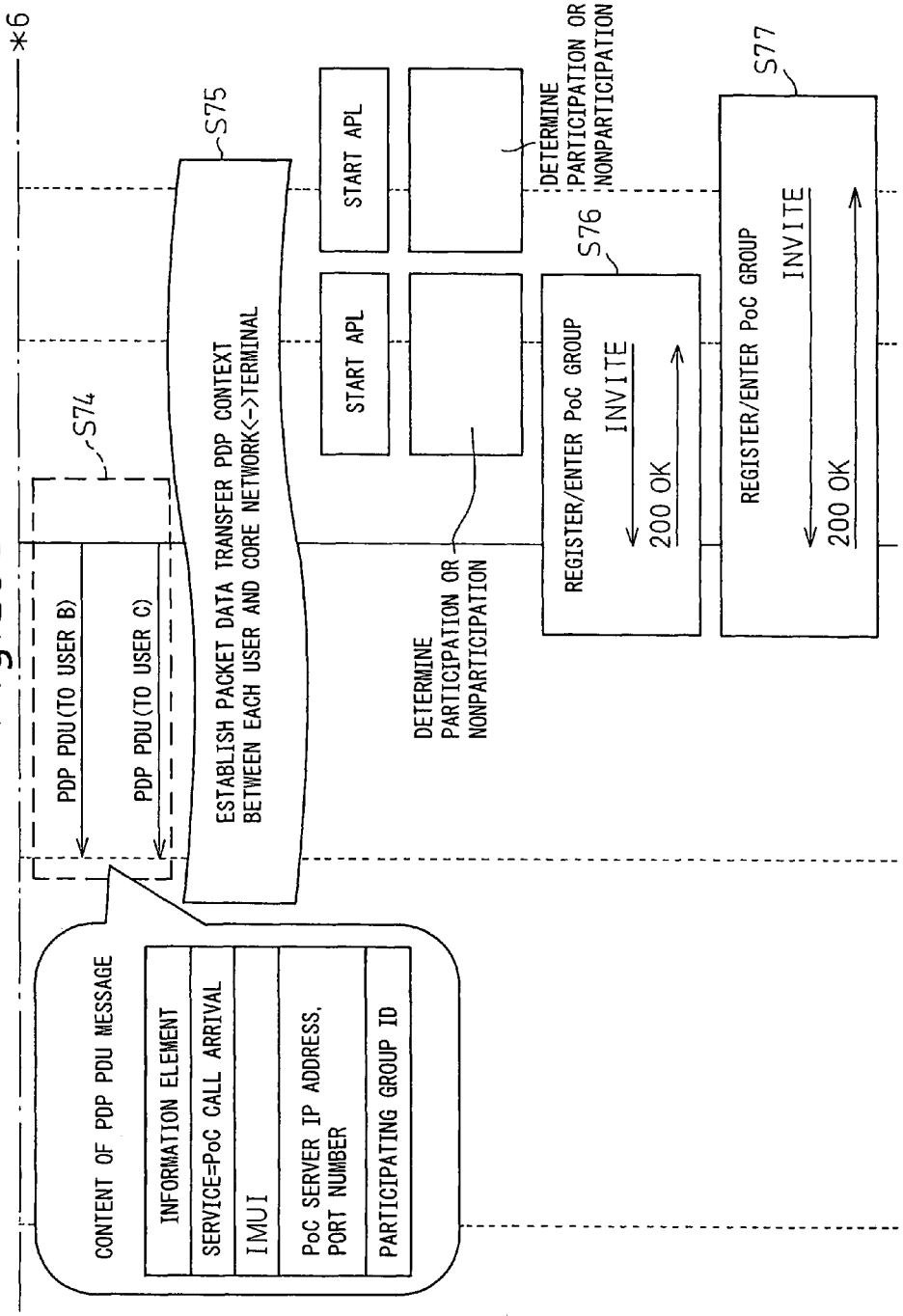

Fig.32A

CONFERENCE ROOM STATE TABLE 703

| CONFERENCE ROOM | CONFERENCE ROOM STATE |
|---|---|
| I | CONFERENCE ROOM ACTIVE |
| II | INITIAL STATE |
| III | INITIAL STATE |

Fig.32B

USER STATE TABLE 704

| USER | STATE | FINAL CONFIRMATION TIME |
|---|---|---|
| D | INITIAL | - |
| E | PRESENT | 10 : 05 |
| F | ABSENT | 9 : 55 |

Fig.32C

CONFERENCE LOG MANAGEMENT TABLE 83

|  | TRANSMISSION SOURCE | TIME | DATA FILE |
|---|---|---|---|
| I | D | 9 : 45 | DISCARD |
| I | D | 9 : 50 | DISCARD |
| I | E | 9 : 55 | DISCARD |
| I | D | 10 : 00 | DATA 1 |
| I | E | 10 : 05 | DATA 2 |

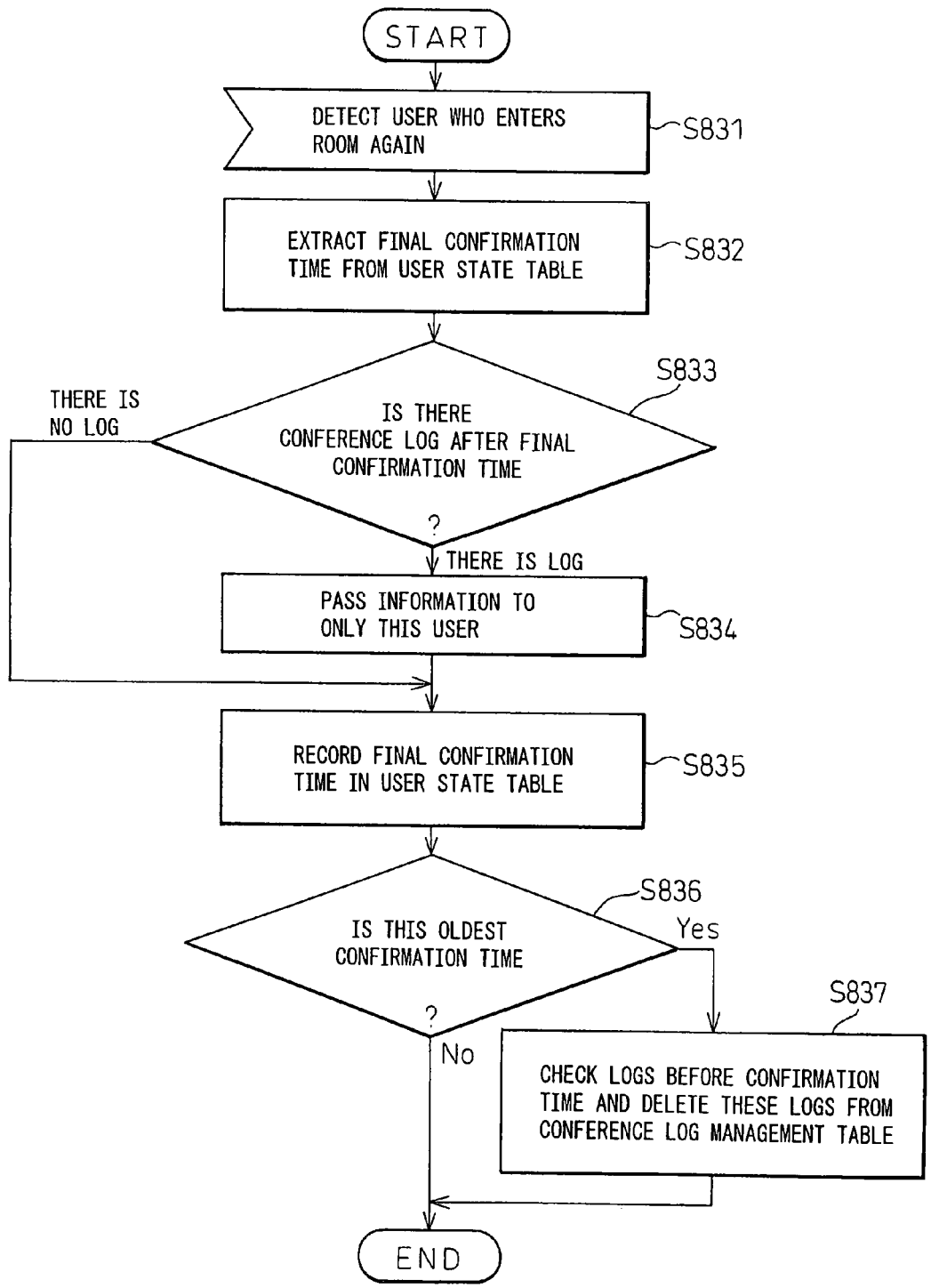

CONTENTS SERVER AND CONTENTS SERVER SYSTEM

CROSS-REFERENCE TO RELATED APPLICATION

This application is a continuation application and is based upon PCT/JP2005/005938, filed on Mar. 29, 2005. (which claims priority from International Application No. PCT/JP2004/016670, filed on Nov. 10, 2004.)

TECHNICAL FIELD

The present invention relates to a contents server and a contents server system. Particularly, the invention relates to a PoC server and a PoC server system that provide a PoC (Push to talk over Cellular) service to enable a user to use a portable terminal present in a radio communication area as a transceiver (PTT: Push to Talk). Further, the present invention relates to a meeting server and a meeting system that provide a meeting service such as an audio teleconference and videoconference via an IP network.

BACKGROUND ART

With the recent increase in use of portable telephones, there has been an increasing demand for new services such as high-speed data communication for transferring images and moving pictures, in addition to conventional one-to-one audio communication service. A PoC service in which the 3GPP (the third Generation Partnership Project) produces a fundamental specification is also expected to increase as one such new service (see the Nonpatent Document 1).

FIG. 1 shows one example of a mobile communication system that provides a PoC service. In the present example, a portable telephone having a PTT button as shown in enlargement at the right upper side of the drawing is used for the terminal matching the PoC. When the PoC-matched terminal is used, a user can talk to plural persons within the same group by depressing the PTT button, and can listen to these persons talk by releasing the finger from the PTT button.

In FIG. 1, a telecommunications business provider that provides the PoC service installs a PoC server 1 within a provider network including an IP packet communication link radio network. When a user dials a number (special number) of a group in which the user wants to participate, using a PoC-matched terminal A or B present in a radio area 3 or 4, the corresponding PoC-matched terminal A or B first establishes a communication link with the IP packet communication link radio network. Next, the corresponding PoC-matched terminal A or B establishes a communication link with an SIP (Session Initiation Protocol) control unit 11 of the PoC server 1 using this network based on the SIP protocol.

After a communication link is established, when a user A of the PoC-matched terminal A depresses the PTT button and talks, voice is converted into an RTP (Real-time Transport Protocol) packet, and is transmitted to the PoC server 1. The PoC server 1 multicasts the received RTP packet to PoC-matched terminals B and C that belong to the same group as that of the PoC-matched terminal A, via an RTP bridge unit 12. In the present example, the PoC-matched terminal C is present in an out-zone in which radio communication is not possible. Therefore, the PoC-matched terminal C cannot receive the RTP packet.

The above PoC server and the PoC service system can be similarly applied to an audio teleconference system and a videoconference system via a network. In this case, when plural conference terminals access a conference server within the IP network and receive an RTP packet containing audio information and image information transmitted from a conference terminal having the conference server, the RTP packet is multicast to conference terminals of other users participating in the same conference.

Nonpatent Document 1: 3GPP TR 23.070 v.0.4.0 (2004-05)

DISCLOSURE OF THE INVENTION

Problems that the Invention is to Solve

As shown in the above example, according to a normal PoC service, a problem exists in that only a user of the PoC-matched terminal C present in the outer communication area is not able to obtain information reported in the same group. This decreases the convenience of sharing in real time the statements from users participating in the same group which the PoC service should basically provide, and decreases service quality as well.

In this case, it is considered possible for the PoC server 1 to store audio information to be reported to the same group, and reproduce and report this audio information to the PoC-matched terminal C after the PoC-matched terminal C enters the radio area. However, for this purpose, a large-capacity storage device that accumulates data from plural users needs to be prepared in the PoC server 1. Consequently, the cost of providing the PoC service increases.

The same can be also applied to the above conference system. In other words, when a user joining in the conference is temporarily absent or when a user joins the conference in the middle of the conference, the user cannot accurately obtain the interacted information while the user is absent. Therefore, either distributed streaming information needs to be autonomously recorded in individual user terminals, or the conference server needs to record all streaming information during the whole period of the conference.

However, in the former case, the users are forced to carry out a complex recording operation. Further, when the users record all contents of the conference, it is not preferable from a security viewpoint that confidential information be leaked out. In the latter case, the conference server needs to prepare a large log area during each conference. In particular, when information containing a large quantity of audio and image data is recorded at a television conference or the like, cost of the conference service increases.

In the light of the above problems, it is an object of the present invention to provide a contents server and a contents service system capable of securely sharing information from attendant users in the same group or a conference room in a contents service and capable of providing the information at reasonable cost, by providing a unit which accumulates and reproduces audio and image data from plural users and a unit which deletes and updates the accumulated data-based on a state management of each user, in the contents server including a PoC server and a conference server.

Means to Solve the Problems

The present invention provides a contents server including: a recording unit that records media information from plural users in a communicatable state participating in a predetermined group, for each group; a detecting unit that detects at each predetermined time a communicatable state or an uncommunicatable state of each participating user; and a deleting unit that deletes media information the necessity or unnecessity of which has been confirmed from media information already recorded in the recording unit, upon detecting that all of the participating users are in a communicatable state. The contents of the above include various kinds of media such as voice, image, video, text, and program data.

When none of the participating users participate in the group, the deleting unit deletes media information from the group from the recording unit. In this case, the deleting unit regards that a user is not participating in the group when the detecting unit detects that this user is in the uncommunicatable state, and also when this uncommunicatable state lasts for a predetermined period of time. The contents server also includes: an extracting unit that extracts media information recorded during a period from when the user is in an uncommunicatable state until the user is once again in a communicatable state, from the recording unit, when the detecting unit detects that the user in an uncommunicatable state enters the communicatable state again; and a transmitting unit that transmits media information extracted by the extracting unit to only the user who has entered the communicatable state again. The detecting unit further detects a temporary uncommunicatable state that a user in the communicatable state can personally set. The temporary uncommunicatable state is processed in the same manner as that of the normal uncommunicatable state.

The contents server further includes: a selecting unit that presents media information extracted by the extracting unit to a user who has entered the communicatable state again to enable the user to select information, and allows the user to transmit only information selected by the user to the transmitting unit; and a web control unit that provides additional services and options to the user. The additional services include a selection of a participating group to the user, a selective transmission of stored media information, or a notification of a communicatable state and an uncommunicatable state. The contents server further includes a participation requesting unit that requests other users in the participating group to participate in the group when the detecting unit detects the participating user. The contents server provides a PoC accumulation service or a teleconference service.

The present invention further provides a contents service system including a communication network, a contents server, a subscriber database, and plural terminals belonging to a predetermined group, wherein the subscriber database manages for each group a subscription state of users of the terminals in the content service, the contents server stores media information in the uncommunicatable state of the terminals for each group. When the terminals are once again in the communicatable state, the contents server transmits the media information recorded during a period from when the terminals are in the uncommunicatable state until the terminals are once again in the communicatable state, to only these terminals, and thereafter deletes the media information.

The contents service system further includes a web server. The web server provides additional services to the contents service, and provides options to the terminals, using a web control function. Additional services include a selection for a participating group, a selective transmission of stored media information, or a notification of a communicatable state and uncommunicatable state.

The contents service system further includes a presence server. The presence server manages the communicatable state and uncommunicatable state of the terminals. The contents server provides the contents service, based on a notification of a change of the communicatable state and uncommunicatable state from the presence server, or response information to an enquiry about the communicatable state and uncommunicatable state made to the presence server.

The presence server detects the communicatable state and uncommunicatable state of each terminal at a predetermined time, and manages these states. Upon detecting a terminal that participates in the group, the contents server notifies the other terminals of the group about participation in the group.

Effect of the Invention

According to the present invention, information to be notified can be temporarily stored in an uncommunicatable state, such as when presence of a group user in the communication area or presence of a user participating in the conference cannot be confirmed. When the user is once again in the communicatable state, such as when the user is present in the communication area or when the user is present in the conference, the user can personally confirm necessity or unnecessity of the information, so that only necessary information can be retransmitted to the user. As a result, information can be securely shared among users participating in the same group using the PoC service or the conference server.

According to the present invention, the stored notification information can be deleted or updated automatically, based on the management state of the communicatable state and uncommunicatable state, such as when each user is in the inner radio area or outer radio area and when each user is present or absent in the conference room. Therefore, expansion of the scale of the storage device in the PoC server or the conference server can be prevented, and service can be provided at a reasonable operation cost while maintaining service quality. The present invention can be also similarly be applied to various kinds of group services in a radio LAN, etc.

As an example, in the case of a teleconference system using an MCU, conference log information during a time zone when a user is not participating or cannot participate in the conference can be provided while maintaining security, by integrating all streaming information containing a large quantity of data images and voice in the MCU, and by linking a conference log function of accumulating conference information to a state of a user participating in the conference.

BRIEF DESCRIPTION OF THE DRAWINGS

FIG. 1 is a view showing one example of a mobile communication system that provides a PoC service.

FIG. 2 is a view showing a first embodiment of the present invention.

FIG. 3A is a view showing one example of a subscriber management table.

FIG. 3B is a view showing one example of a group state table.

FIG. 6 is a view showing one example of an out-zone detection flow.

FIG. 9 is a view showing one example (1) of a media log deletion control flow shown in FIGS. 7A and 7B.

FIG. 10 is a view showing one example (2) of a media log deletion control flow shown in FIGS. 7A and 7B.

FIG. 11A is a view showing one example (1) of a media log deletion sequence when a user in the out-zone is present.

FIG. 11B is a view showing one example (2) of a media log deletion sequence when a user in the out-zone is present.

FIG. 12 is a view showing one example of a media log deletion control flow shown in FIG. 10.

FIG. 13 is a view showing a second embodiment of the present invention.

FIG. 20 is a view showing one example of a user state table within a presence server.

FIG. 22A shows one example (1) of a media log deletion sequence when all participating users are present.

FIG. 22B shows one example (2) of a media log deletion sequence when all participating users are present.

FIG. 24B is a view showing one example (2) of a media log deletion sequence when a participating user is in the out-zone.

FIG. 25A is a view showing one example (1) of a media deletion sequence when a participating user is absent.

FIG. 25B is a view showing one example (2) of a media deletion sequence when a participating user is absent.

FIG. 28A is a view showing one example (1) of a sequence for making other users compulsively participate in a group at a user participation time.

FIG. 28B is a view showing one example (2) of a sequence for making other users compulsively participate in a group at a user participation time.

FIG. 32A is a view showing one example of a conference room state table.

FIG. 32B is a view showing one example of a user state table.

FIG. 32C is a view showing one example of a conference log management table.

FIG. 39 is a view showing a processing flow example when a present user is detected.

BEST MODE FOR CARRYING OUT THE INVENTION

Figure 3C:
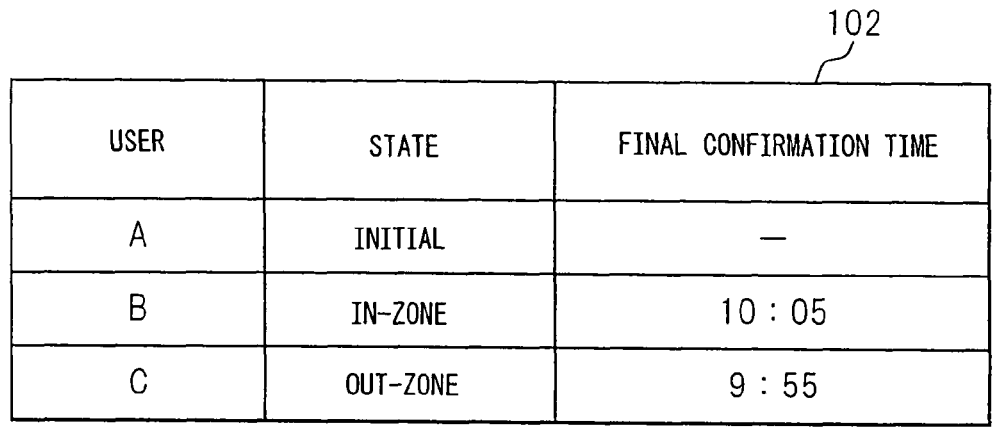
FIG. 3C is a view showing one example of a user state table.

FIG. 2 shows a PoC server and a PoC service system according to a first embodiment of the present invention.

In the present example, the PoC server 1 stores (accumulates) media information when a user is in the out-zone, and reproduces necessary information and provides the user with this information when the user is once again in the in-zone state (the user participates in a group). For this control, the PoC server 1 includes a group state table 101, a user state table 102, a media log management table 141, and a subscriber management table 501 in an external user database (HSS: Home Subscriber Server) 5. A user dials a group number of a PoC service or a PoC accumulation service in which the user wants to participate, thereby participating in a desired group. In the former PoC service, users participating in the same group use a normal transceiver function to communicate between them. In the latter PoC accumulation service, a user can listen to statements of other participating users accumulated while the user is in the out-zone, when the user is once again in the in-zone state.

In FIG. 2, PoC-matched terminals A and B within radio areas 3 and 4 (see FIG. 1) of the IP network built in a radio network establish a communication link with an SIP control unit 11 of the PoC server 1 using an SIP message of the SIP protocol, via an IMS (IP Multimedia Subsystem) 2 corresponding to the provider network shown in FIG. 1.

An RTP control unit 13 multicasts an RTP packet received from the PoC-matched terminal to another PoC-matched terminal of the same group via an RTP bridge 12. A media log managing unit 14 temporarily stores media information of the RTP packet received from the PoC-matched terminal into the database, and manages the stored content in the media log management table 141. The stored media information is suitably deleted or updated by the present invention described later.

The PoC control unit 10 implements the PoC accumulation service of the present invention in coordination with the SIP control unit 11, the RTP control unit 13, and the media log managing unit 14, with an outer control unit 103 using management tables 501, 101, 102, and 141. The user database (HSS: Home Subscriber Server) 5 establishes a communication link with the PoC server 1 via the IMS 2, and provides the PoC server 1 with subscriber user information of the PoC service and accumulation service. The user database 5 can be built into the PoC server 1.

Figure 4:
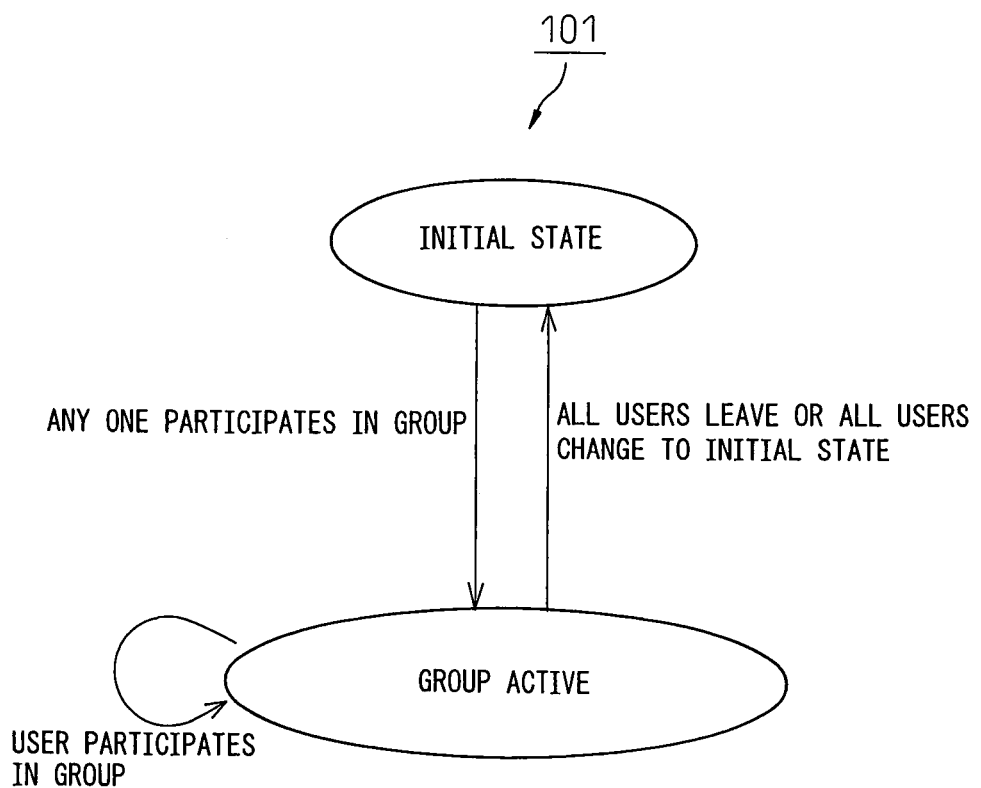
FIG. 4 is a view showing one example of a group state transition.
Figure 5:
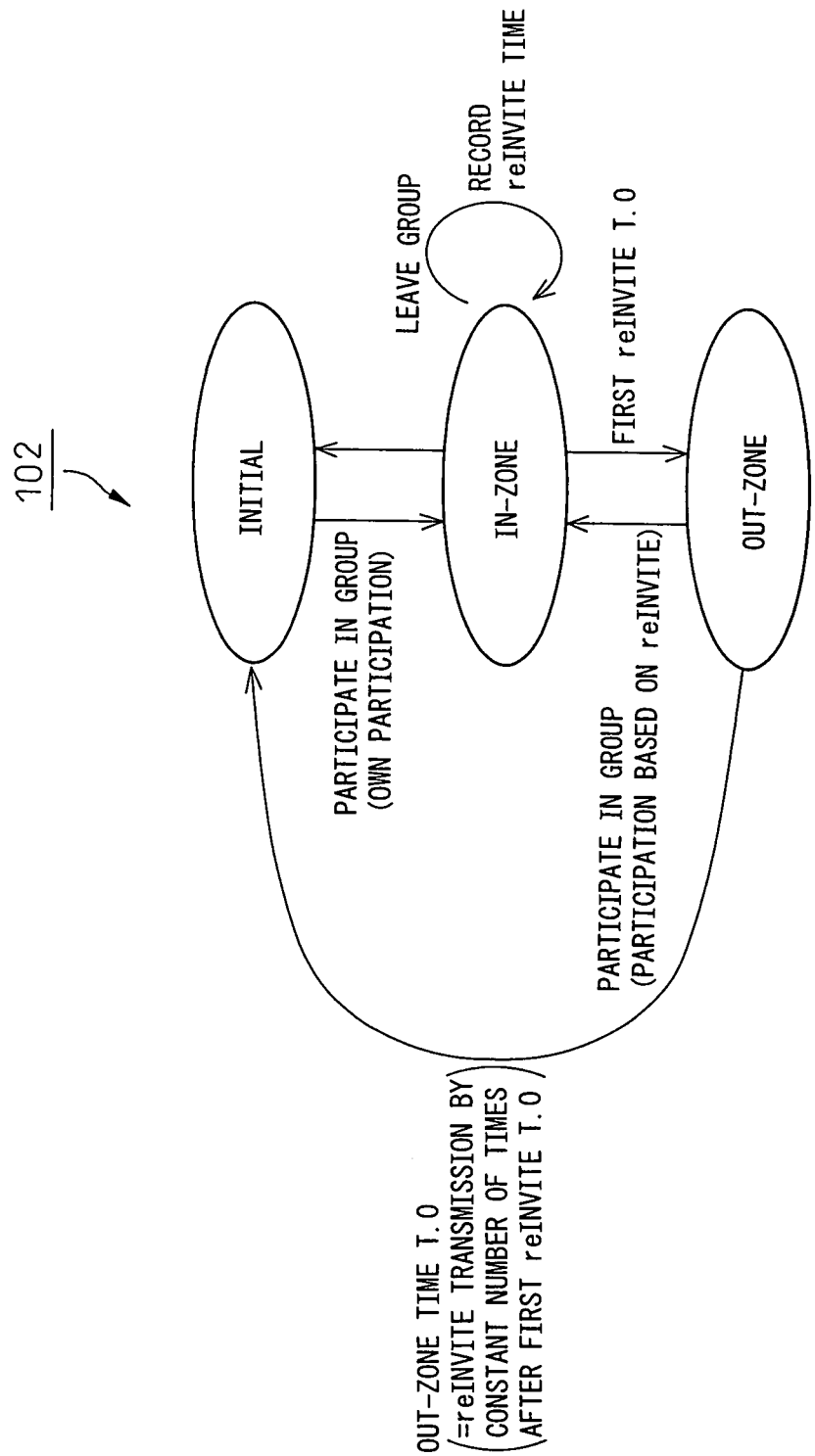
FIG. 5 is a view showing one example of a user state transition.

FIGS. 3A to 3D show one example of management tables 501, 101, 102, and 141. FIGS. 4 to 6 show state transition diagrams or operation flow diagrams concerning the management.

FIG. 3A shows one example of the subscriber management table 501 of the user database 5. Subscription states of the PoC service and the PoC accumulation service by registered users A to E are managed in this table. For example, user A in the present example subscribes to both the normal PoC service in which the user can use the PTT function, and the PoC accumulation service in which the user A can reproduce and obtain media content transmitted from other participating users during a period from when the user A is in the out-zone till when the user A returns to the in-zone state again. User A can use the above services by joining a group I or II.

FIG. 3B shows one example of the group state table 101. The PoC control unit 10 controls each of the plural PoC groups I to III in two states including an initial state in which no user is participating in the group and a group active state in which at least one user is participating in the group. In the present example, at least one user is participating in group I, and no user is participating in groups II and III.

FIG. 4 shows a transition diagram of a group state.

In the beginning, all users are not participating in a group, and therefore, the group is in the initial state. When at least one user participates in the group, this group changes from the initial state to the group active state. Even when another user participates in the group in the group active state, the group state remains unchanged. When all participating users leave the group or when the group is changed to the initial state, this group returns to the initial state.

FIG. 3C shows one example of user state table 102.

User state table 102 records users who subscribe to the PoC accumulation service (see FIG. 3A) and participate in the group, a state of each user concerning whether or not the user is in the in-zone or in the out-zone after participating in the group, and the time when the presence of each user in the in-zone is confirmed. In the present example, user A is in the initial state, user B is in the in-zone, and user C is in the out-zone. Times when the user B and the user C are last confirmed to be in the in-zone and in the out-zone, respectively are recorded for these users.

FIG. 5 shows a user state transition diagram, and FIG. 6 shows one example of an out-zone detection flow. The out-zone control unit 103 executes this out-zone detection process. The user state transition process and the out-zone detection process are explained below with reference to FIGS. 5 and 6, using FIG. 3C as an example.

In the beginning, none of users A to C are participating in the PoC accumulation service. Therefore, in the present example, users A to C registered in the group I are set to the initial state in advance (FIG. 5). The user state table 102 is also blank in the beginning, and when each user participates in the group, this participating user is added to the table 102 from the out-zone state. Each of users A to C dials the number of group I, and participates in group I. With this arrangement, participating users A to C change to the in-zone state, and group I changes to the group active state (see FIG. 4).

The out-zone control unit 103 is started when a group changes to the group active state. The out-zone control unit 103 starts the out-zone detection process of detecting a user participating in the group when at least one participating user talks. Therefore, the SIP control unit 11 is controlled to transmit a reINVITE message as the SIP message to each of the PoC-matched terminals A to C of the participating users at a predetermined cycle. Upon receiving the reINVITE message, each PoC-matched terminal returns a 200OK message in response to this message.

When reception of the 200OK message from the PoC-matched terminal B is confirmed within a timeout period, the out-zone control unit 103 maintains the user B in the in-zone state. On the other hand, in the present example, there is no response from PoC-matched terminals A and C. Therefore, the states of users A and C are changed to out-zone at the time of detecting the first timeout (first reINVITE T.O) (S101 and S102 in FIG. 6). Upon confirming that the participating users are in the out-zone, the out-zone control unit 103 informs the group users that the out-zone users (users A and C) are present, using a voice recorded in advance, and starts an out-zone timer (reINVITE message transmission time at a constant number of times after the first reINVITE T.O) to each of users A and C (S103 and S104 in FIG. 6).

In order to once again confirm the in-zone of users A and C, the out-zone control unit 103 periodically transmits the reINVITE message to PoC-matched terminals A and C, within an out-zone timer time (S105 in FIG. 6). When PoC-matched terminal C temporarily moves to the out-zone, such as when the terminal is passing a tunnel, for example, the state of user C can be changed to the in-zone state once again (participation in the group) by returning the 200OK message in response to the reINVITE message received after user C has passed the tunnel (S106 in FIG. 6).

On the other hand, when user A is in the out-zone state for more than the out-zone timer time, the out-zone timer times out (T.O.), and the state of user A changes to the initial state (FIG. 5). In this case, the out-zone timer of user A is stopped, and transmission of the reINVITE message to user A is also stopped (S109 in FIG. 6). User state table 102 in FIG. 3C shows a result of detecting the out-zone as one example.

Figure 3D:
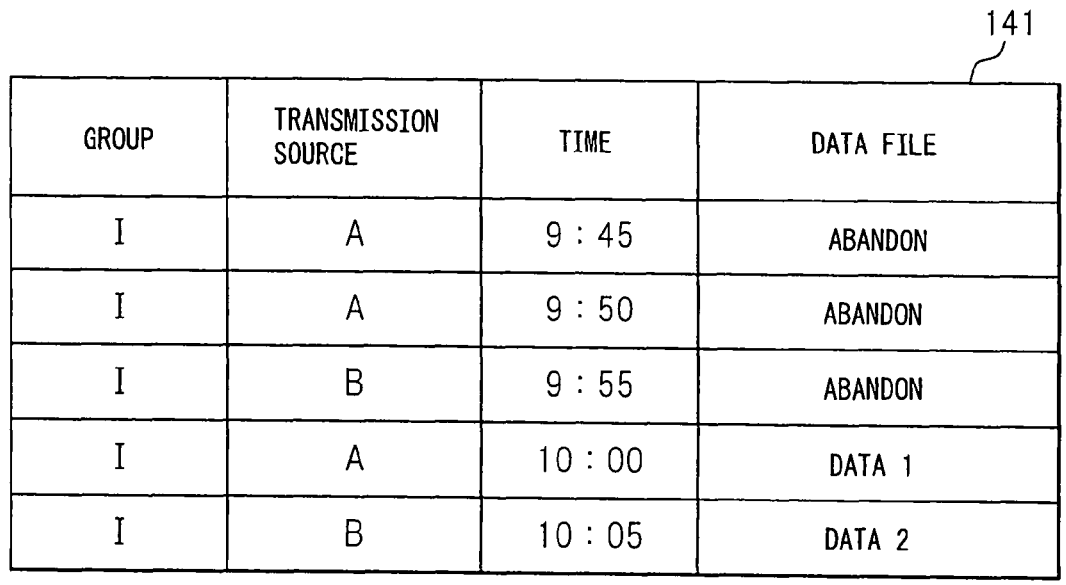
FIG. 3D is a view showing one example of a media log management table.

FIG. 3D shows one example of the media log management table 141.

The PoC control unit 10 records a group name, transmission source, transmission time, and media data, each time when various media data such as audio data, text data, and image data are transmitted from the PoC-matched terminal. On the other hand, only unnecessary media data is abandoned by the processing described later, and the transmission source and transmission time are stored as log.

In the present example, contents of statements made by users A and B participating in group I are sequentially accumulated in the media log database 14 together with the statement time, as media log information. When notification to the users participating in group I is completed or is no longer unnecessary, data files of these statements are sequentially deleted in a predetermined condition described later. With this arrangement, sharing of information among the members in the same group can be secured. The PoC service can be provided at reasonable service operation cost, while maintaining service quality permissible within a proper storage capacity size of the media log database 14. A method of deleting the media log information according to the present invention is explained below with reference to detailed examples, based on the above explanation.

Figure 7A:
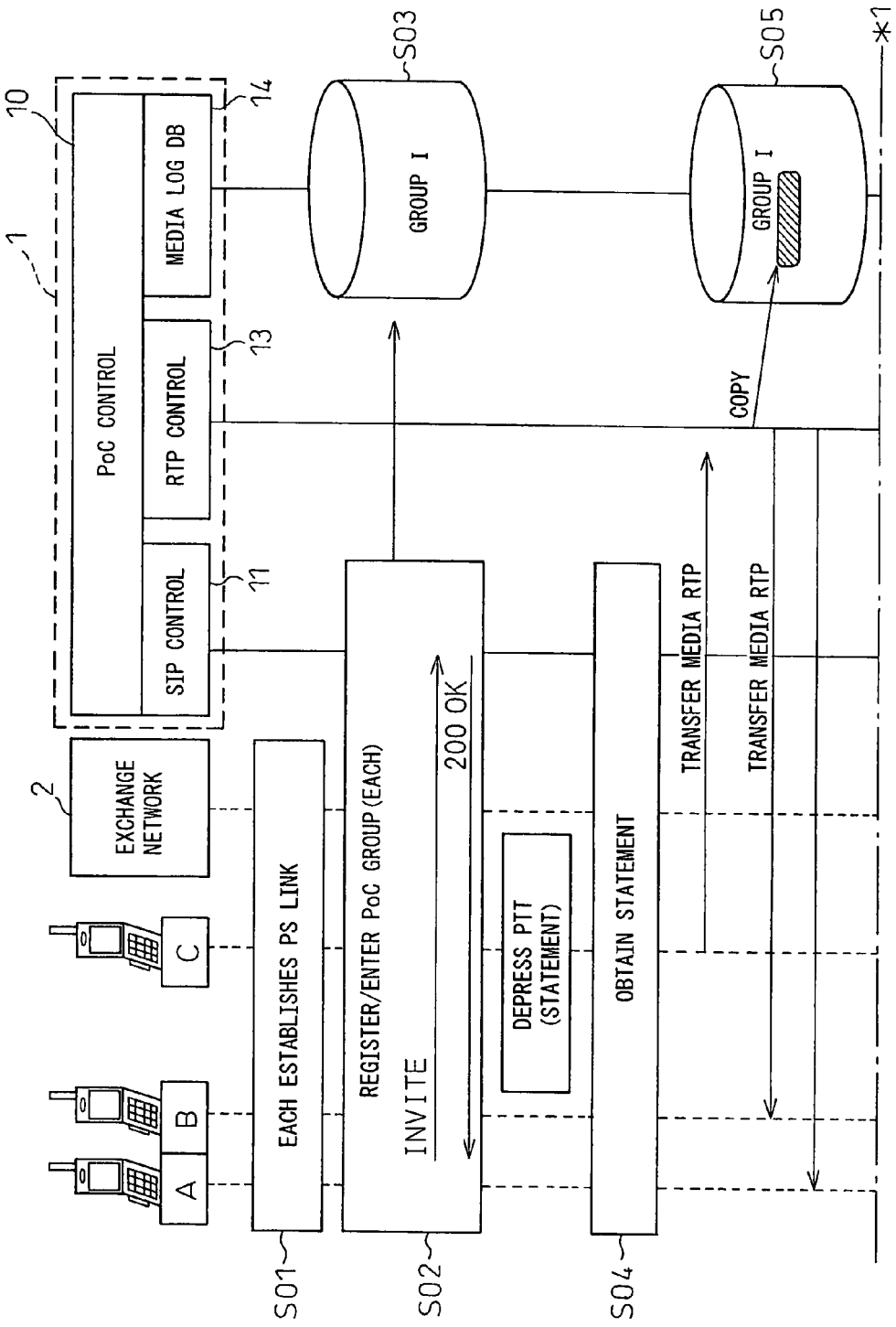
FIG. 7A is a view showing one example (1) of a media log deletion sequence when all participating users are present in the zone.
Figure 7B:
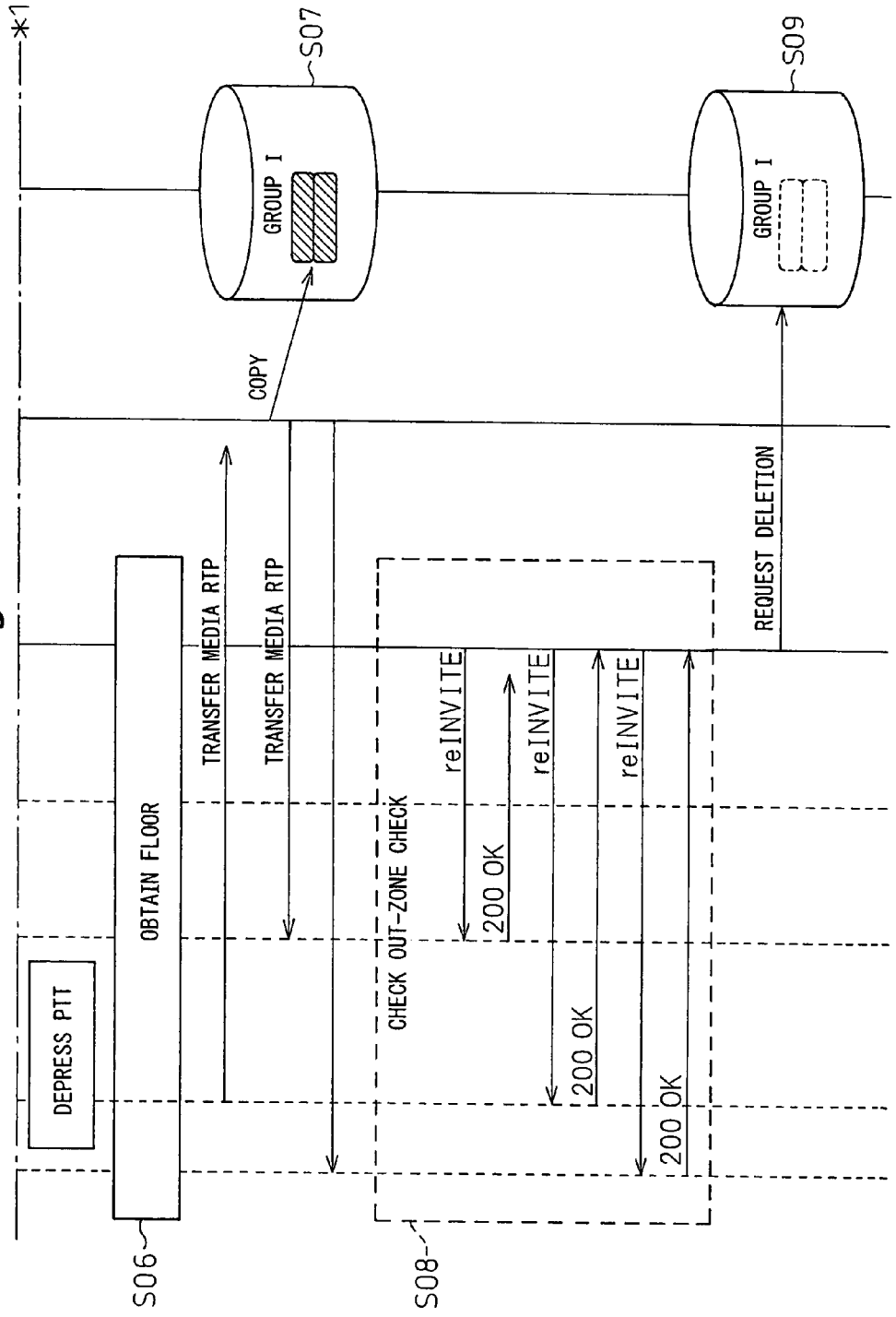
FIG. 7B is a view showing one example (2) of a media log deletion sequence when all participating users are present in the zone.
Figure 8:
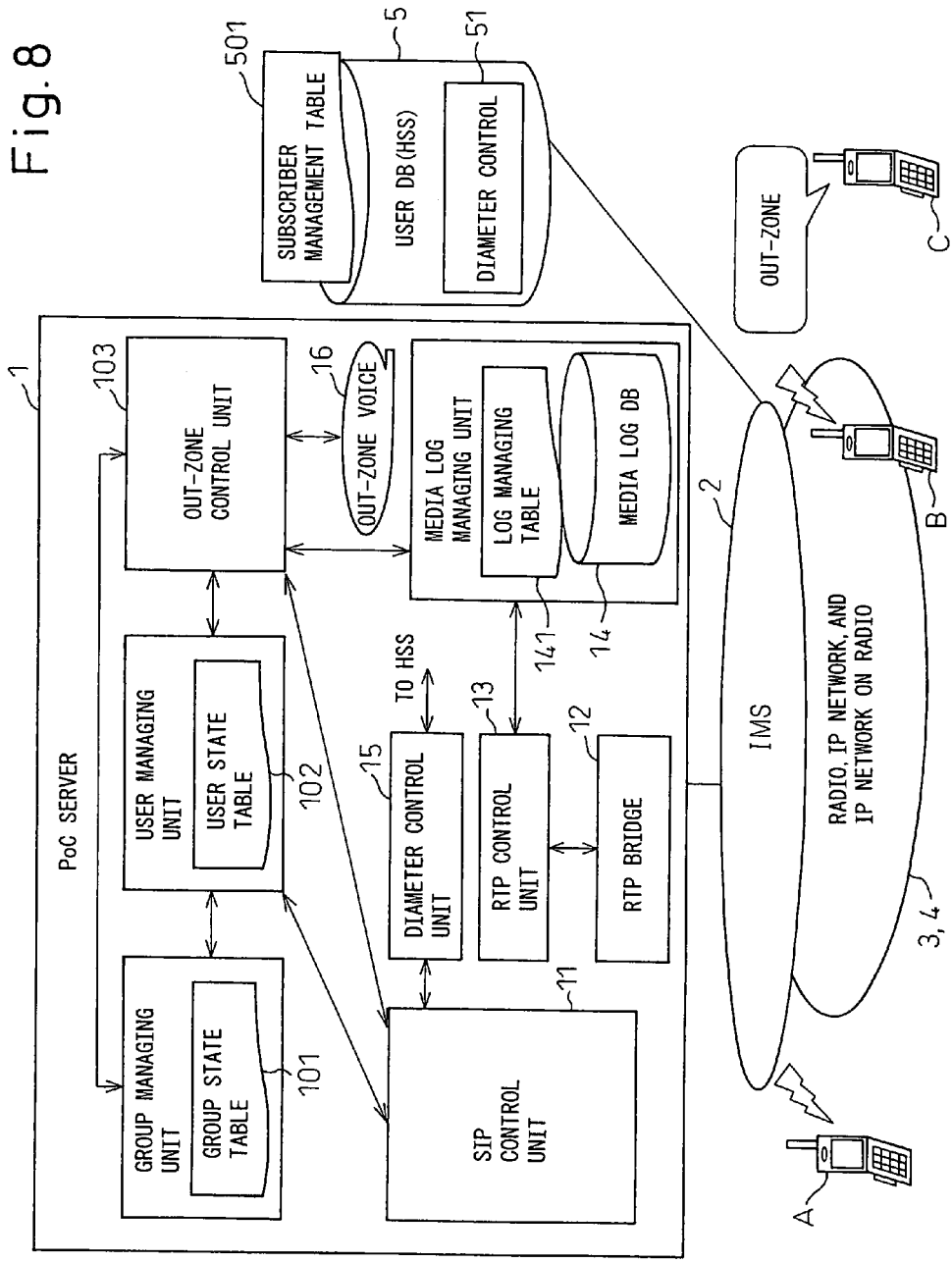
FIG. 8 is a view showing a detailed configuration example of a PoC server 1 shown in FIG. 2.

FIGS. 7A and 7B show one example of a media log deletion sequence when all participating users are in the in-zone. FIG. 8 shows a detailed configuration example of the PoC server 1, and FIGS. 9 and 10 show one example of a media log deletion control flow. In FIG. 8, a part of the PoC control unit 10 explained above is shown in detail as a group managing unit, a user managing unit, and a media log managing unit.

In FIGS. 7A and 7B, each of users A to C dials group I of the PoC accumulation service. With this arrangement, a PS link is established, and each user is connected to PoC server 1 and participates in desired group I (S01 and S02). In this case, the SIP control unit 11 references the subscriber management table 501 of the user database 5 via a DIAMETER control unit 15, based on a change instruction of a user state contained in the message when the user participates in the group (at the time of receiving the first INVITE). The DIAMETER control unit 15 accesses the user database (HSS) included in an exchange network 2 (FIG. 7A) using the DIAMETER protocol.

The SIP control unit 11 carries out a user authentication by referencing the subscription state of a participating user corresponding to a user identifier (SIP-URI) contained in a From header of the INVITE message. A new subscription to the PoC service is registered in a similar process. Upon completing the authentication process, the SIP control unit 11 notifies the user managing unit to update the state (initial state to the in-zone) of the participating user in the user management table 102. In this case, at least one participating user is present in group I. Therefore, the user managing unit notifies the group managing unit to change the state of group I from the initial state to the group active state. When all users participating in the group leave the group or change to the initial state, the user managing unit notifies the group managing unit. Upon receiving this notice, the group managing unit changes the state of this group from the group active state to the initial state.

In the present example, user C depresses the PTT button of the PoC-matched terminal C to acquire the floor (S404). The statement made by user C is converted into a RTR packet inside the PoC-matched terminal C, and the RTP packet is transmitted to PoC server 1. The RTP control unit 13 transmits the received media information to the media log managing unit. The media log managing unit sequentially stores (accumulates) the media information into the media log database 14 (S05), and writes the storage address of user C of the transmission source, group, reception time, and log data file, into the media log management table 141 (see FIG. 3D). The RTP control unit 13 controls the RTP bridge 12 to multicast the received RTP packet to participating users A and B within the same group. In the present example, user B also repeats a similar process (S06 and S07).

When the media log managing unit notifies the presence of the accumulated media data to the out-zone control unit 103, the out-zone control unit 103 starts the out-zone detection process (S08) explained with reference to FIG. 3C, FIG. 5, and FIG. 6. Specifically, the out-zone control unit 103 instructs the SIP control unit 11 to transmit the reINVITE message of a predetermined cycle to PoC-matched terminals A to C of the participating users. This transmission process of the reINVITE message is repeatedly executed to each PoC-matched terminal of which each user is in a state other than the initial state, until the SIP control unit 11 receives a notification that the state of group I has been changed to the initial state from the group managing unit.

In the present example, SIP control unit 11 confirms the response of the 200OK messages from all of the PoC-matched terminals A to C (S08, S201), and notifies this to the user managing unit and the out-zone control unit 103. With this arrangement, the user managing unit maintains the off-zone state of users A to C in the user state table 102, and updates the confirmation time at the response reception time (final confirmation time) (S202).

On the other hand, the out-zone control unit 103 compares the updated content of the user state table 102 and the current content of the media log management table 141, and executes the following media deletion process. The out-zone control unit 103 compares the oldest confirmation time (in the present example, the confirmation time of user C) among the final confirmation times of the users in the user state table 102 with the time (file writing time) of the media log management table 141, and requests the media log managing unit to delete (abandon) all media data files written before the oldest confirmation time. In the present example, when the writing time of the media log data is older than the final confirmation time of the user, the media log data is regarded to have been transmitted to all users, if all of the users are in the in-zone. The media log managing unit deletes all media data files at the request of the out-zone control unit 103 (S203 and S204).

Upon receiving the notice from the group managing unit that the state of group I has changed to the initial state, the out-zone control unit 103 regards that it is not necessary to reproduce and transmit media log data which needs to be acquired in real time (S205). Out-zone control unit 103 requests the media log managing unit to forcibly delete (abandon) all the media log data held by group I in media log database 14. The media log managing unit deletes all of the media data files at the request of the out-zone control unit 103 (S206). Accordingly, only media data which is required to be notified is stored in the log area of the media log database 14. Consequently, users in the same group can securely share information, and the PoC accumulation service can be provided in the permissible service quality and at a reasonable service operation cost.

FIGS. 11A and 11B show one example of a media log deletion sequence when the out-zone users are present. FIG. 12 shows one example of a deletion control flow of media log information shown in FIGS. 11A and 11B. The sequence in which users A to C participate in group I is similar to the process of S01 to S03 in FIG. 7A, and therefore, is not shown in FIG. 11A.

In the present example, user B first acquires the floor by depressing the PTT button of the PoC-matched terminal B (S21). The content of the statement made by user B is converted into the RTP packet inside PoC-matched terminal B, and the RTP packet is transmitted to the PoC server 1. The RTP control unit 13 transmits the received content of the media information to the media log managing unit. The media log managing unit accumulates the media information into the media log database (S22), and writes the storage address of user B of the transmission source, the group, reception time, and log data file, into media log management table 141. RTP control unit 13 controls the RTP bridge 12 to multicast the received RTP packet to other participating users A and C within the same group. In the present example, PoC-matched terminal A that has moved to the out-zone cannot receive the RTP packet from user B, unlike the examples shown in FIG. 7A and 7B.

When the media log managing unit notifies the presence of the accumulated media data to the out-zone control unit 103, the out-zone control unit 103 starts the out-zone detection process (S23). In the present example, the out-zone of user A is detected at S101 to S104 of the out-zone detection flow shown in FIG. 6. The out-zone of user A and its final confirmation time are written into the user state table 102 until the out-zone timer times out. Specifically, when the SIP control unit 11 detects that there is no response to the reINVITE message first transmitted to user A and that this response period times out (initial reINVITE T.O), the SIP control unit 11 starts the out-zone timer, and notifies this effect to the user managing unit and out-zone control unit 103.

The user managing unit changes the user state to the out-zone state, based on notification from the SIP control unit 11. When the out-zone control unit 103 recognizes the first reINVITE timeout of the participating user based on the notification from SIP control unit 11, out-zone control unit 103 responds to the "audio data to be reproduced when a user participating in the PoC group becomes in the out-zone state" recorded beforehand in out-zone audio unit 16 to the participating user via RTP bridge 12 by the control of RTP control unit 13. When an out-zone user is present, the deletion sequence of the media log information based on the in-zone confirmation of all users A to C shown in FIGS. 9 and 10 is not executed (S24).

In the present example, user C in the in-zone depresses the PTT button of the PoC-matched terminal C to acquire the floor (S25). The content of the statement made by user C is accumulated in the media log database 14 (S26). User A in the out-zone cannot obtain the content of the statement made by user C either.

When user A moves to the out-zone before the out-zone timer times out, PoC-matched terminal A receives the reINVITE message transmitted in a predetermined cycle from SIP control unit 11 even while user A is in the out-zone, and responds in the 200OK message (S27). SIP control unit 11 detects the out-zone of user A (reINVITE response confirmation after the first reINVITE T.O), and notifies this effect to the user state managing unit and the out-zone control unit 103. The out-zone control unit 103 receives the notification from the SIP control unit 11 (S301), and executes re in-zone subscriber detection process shown in FIG. 12. The user managing unit updates the state of user A to the in-zone based on the notification from the SIP control unit 11, after extracted data described later notified from the out-zone control unit 103 is transmitted (S305).

The out-zone control unit 103 obtains the final confirmation time of the out-zone moving of user A from the user state table 102 before updating (S302). The out-zone control unit 103 compares the final confirmation time with the writing time of the media log in the media log management table 141, and extracts media log data accumulated after the final confirmation time of user A (S303). The extracted media log data is the accumulation of the content of the statement made by either one or both users B and C while user A is in the out-zone. Therefore, the out-zone control unit 103 requests the media log managing unit to transmit the extracted data to user A. The media log managing unit transmits the transmission-requested data to the RTP control unit 13. The RTP bridge 12 transmits this data to only user A (S28 and S304).

Thereafter, the user managing unit updates the user state table 102 to the in-zone of user A and to the final confirmation time immediately before this detection (S305). The content of the subsequent process (S306 and S307) is similar to that of S203 and S204 in FIG. 8 conditioning the confirmation of the in-zone of users A to C. Therefore, all media data files before the oldest confirmation time are deleted, including the content of the statements made by one or both users B and C accumulated while user A is in the in-zone (S29). As a result, even when a user in the out-zone is present, information can be securely shared among the users in the same group. Further, the PoC service can be provided in the permissible service quality and at reasonable service operation cost.

FIG. 13 shows a PoC server and a PoC service system using the same according to a second embodiment of the present invention.

In the present embodiment, a web control unit 17 is added to the configuration of the PoC server 1 shown in FIG. 2. The web control unit 15 is realized by the known HTTP (Hyper Text Transfer Protocol) server function, and therefore, a browser function is required at the PoC-matched terminals A to C. When this web control function is introduced, a user can easily participate in the PoC accumulation service using a GUI (Graphical User Interface). When user A shown in FIGS. 11B and 12 returns from the out-zone state to the in-zone state, plural options of media log data reproduction methods while the user is in the out-zone can be displayed in the browser. Accordingly, quality of the PoC service can be improved in addition to the improvement in the operability of the PoC service on the user side.

Figure 14:
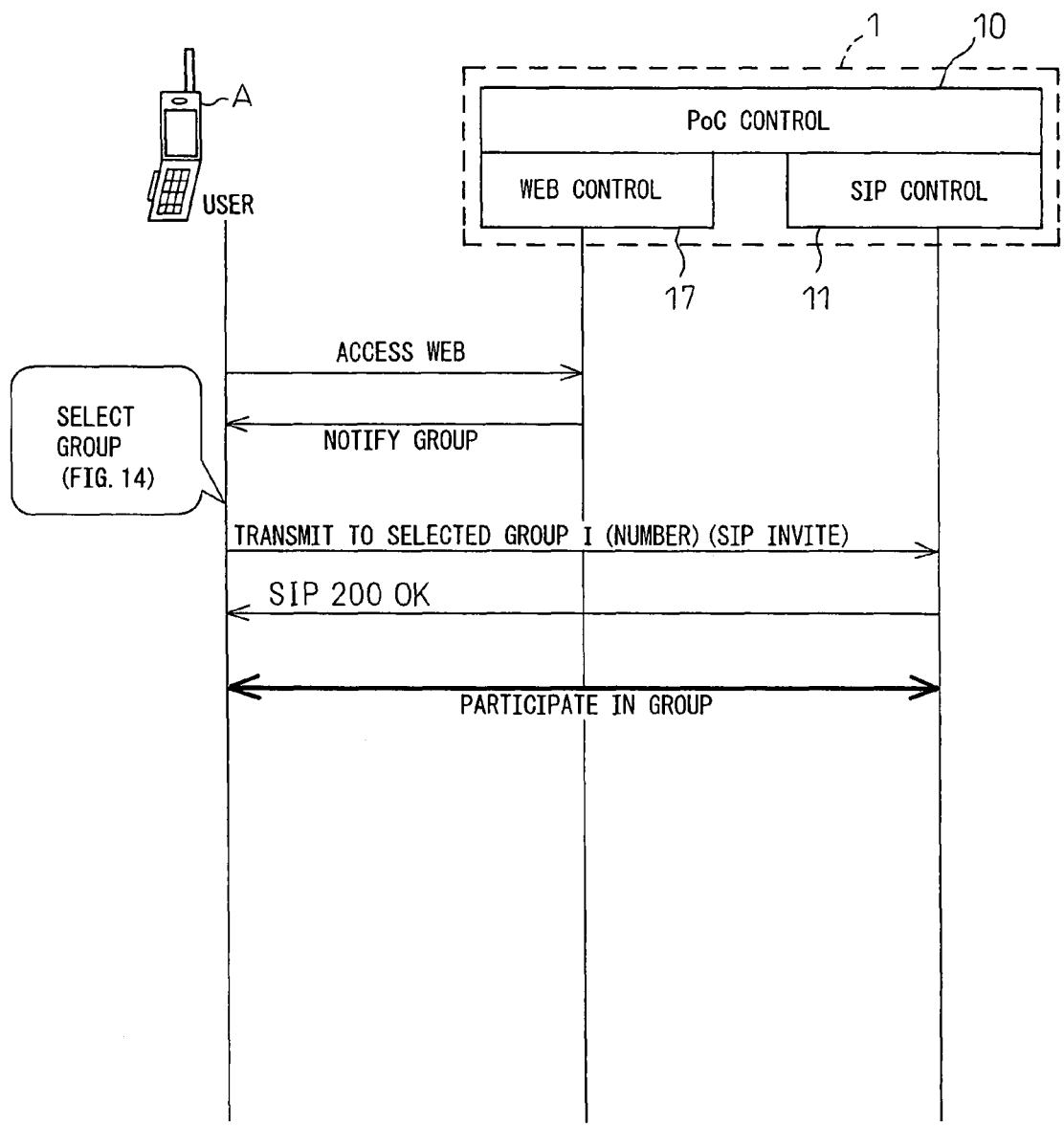
FIG. 14 is a view showing one example of a group participation sequence using a web function.
Figure 15:
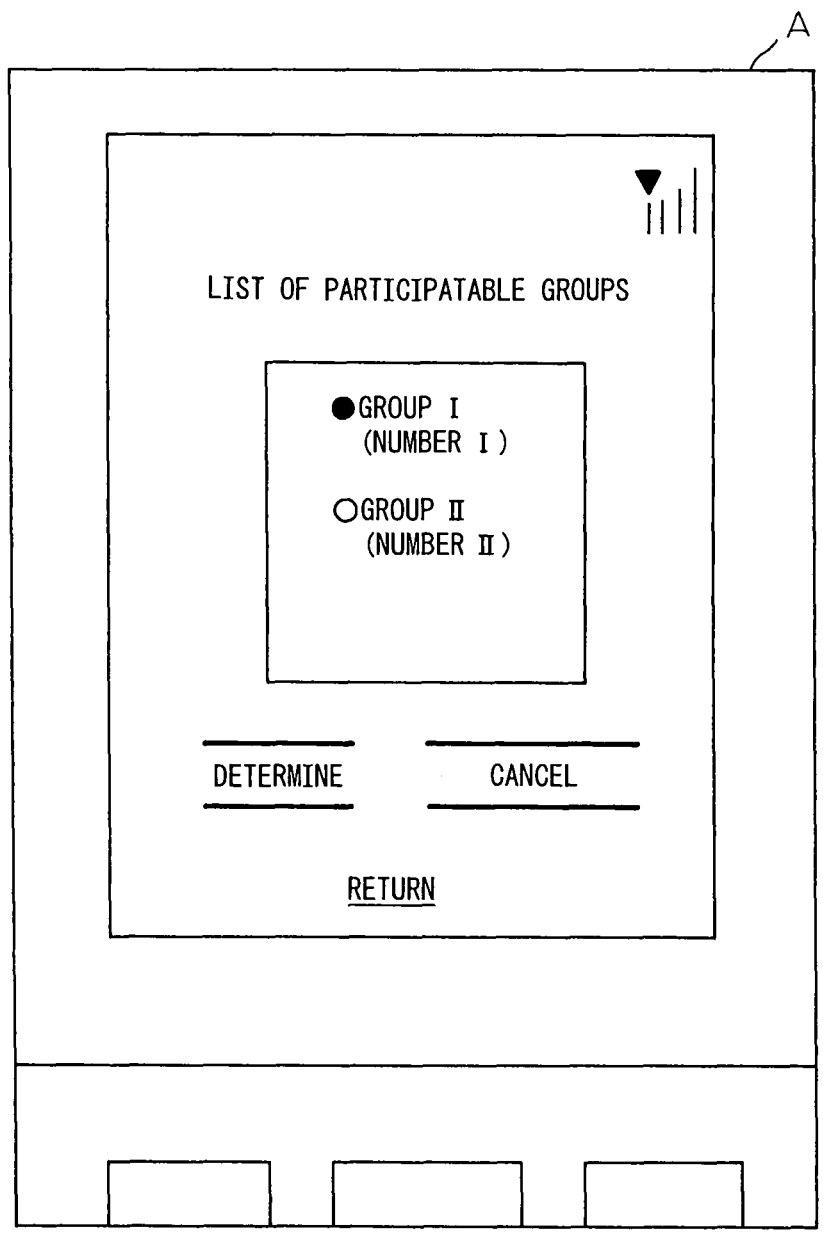
FIG. 15 is a view showing one example of a terminal display screen when a user joins a group.

FIG. 14 shows one example of a group participation sequence using the web function. FIG. 15 shows one example of a display screen of the PoC-matched terminal displayed when a user participates in the group of the PoC service.

In FIG. 14, user A is explained as an example. After establishing the PS link (see S01 in FIG. 7A), the user accesses the web control unit 17 of the PoC server 1 from the PoC-matched terminal A using the HTTP protocol. Accordingly, the PoC control unit 10 notifies information of a list of groups in which user A can participate, to the web control unit 17, by referencing the group state table 101 etc. The web control unit 17 converts this information into HTML data such as the C-HTML (Compact-Hyper Text Markup Language), and transmits this information to the PoC-matched terminal A. The PoC-matched terminal A displays the list of groups in which user A can participate, in the display, using the browser function.

In the example shown in FIG. 14, the list of groups in which user A can participate by the web operation in the initial state is displayed in the PoC-matched terminal A. For example, when user A selects the group I from this list and clicks "determine", the PoC service is started via a CGI (Common Gateway Interface) and the serve let function provided at the PoC server I side. The user can also automatically dial the number of group I using the PHONE TO function of the C-HTML, thereby starting the PoC/PoC accumulation service. The icon at the right upper side on the screen displays reception strength of a radio at the PoC-matched terminal A. Accordingly, user A can participate in the PoC group by selecting the desired group I. This process is similar to that in the first embodiment, and is carried out using the SIP protocol between the PoC-matched terminal A and the SIP control unit 11 (see S02 in FIG. 7A).

Figure 16:
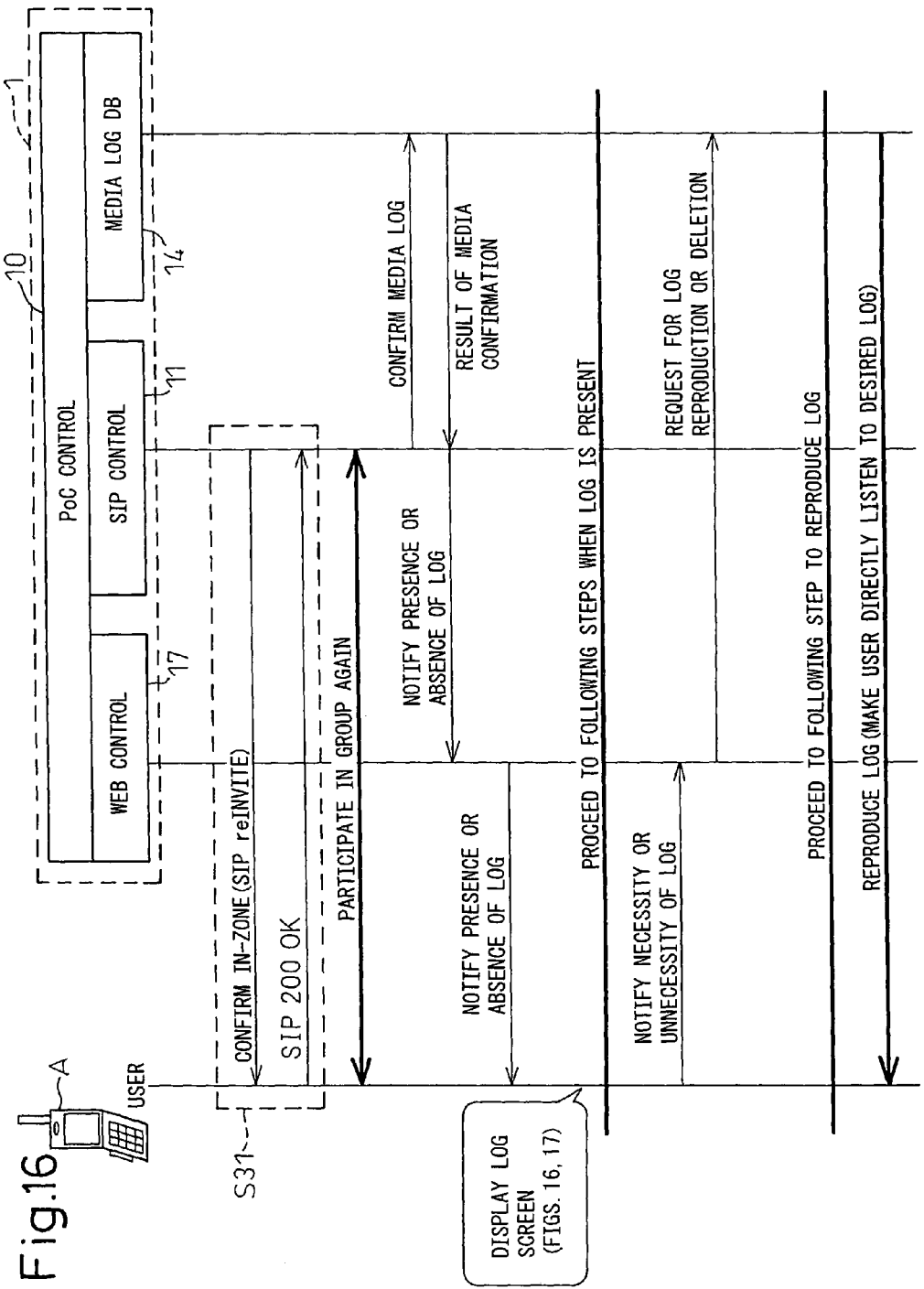
FIG. 16 is a view showing one example of a sequence of group participation from the out-zone using a web function.
Figure 17:
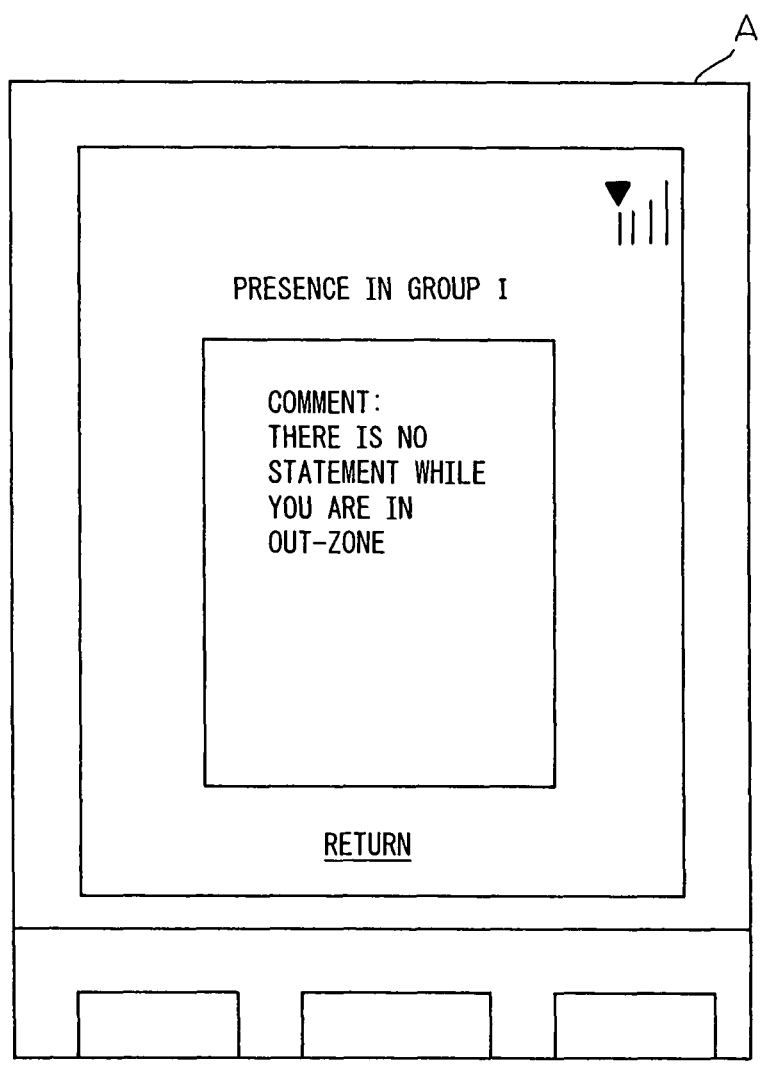
FIG. 17 is a view showing one example (1) of a display screen of a terminal that moves from the out-zone to the in-zone.
Figure 18:
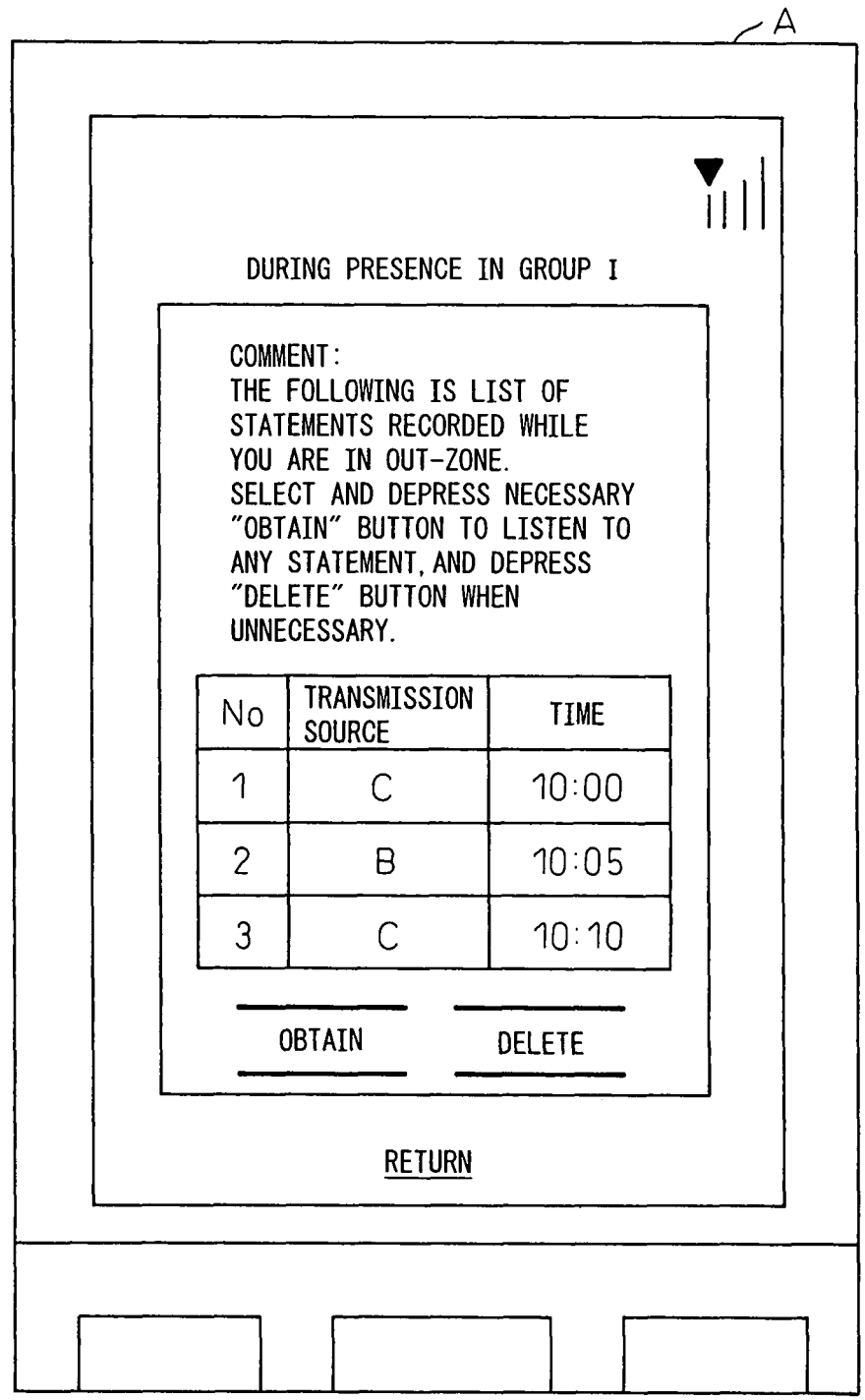
FIG. 18 is a view showing one example (2) of a display screen of a terminal that moves from the out-zone to the in-zone.

FIG. 16 shows one example of a group participation sequence from the out-zone using the web function. FIGS. 17 and 18 show one example of a screen displayed in the PoC-matched terminal of the user, when the participating user moves from the out-zone to the in-zone.

In FIG. 16, the PoC-matched terminal A participating in the group again from the out-zone receives the reINVITE message from the PoC server 1, and replies with a 200OK message (S31). Accordingly, the out-zone control unit 103 within the PoC control unit 10 detects the in-zone state again of out-zone user A.

The out-zone control unit 103 requests the media log managing unit to confirm the accumulated media log, and notifies the presence or absence of a log to the web control unit 17 based on a confirmation result from the media log managing unit. The web control unit 17 converts the notified content to HTML data, and transmits the HTML data to the PoC-matched terminal A. The PoC-matched terminal A displays the notification content of presence or absence in the display, using the browser function.

FIG. 17 shows one example of a display screen when there is a statement from other participating users while user A is in the out-zone. FIG. 18 shows one example of a display screen when there are statements from plural participating users while user A is in the out-zone. In the case of FIG. 18, user A has an option of obtaining the content of the statements made by the other participating users. User A clicks "obtain" by selecting a statement number when user A wants to obtain the statement content. On the other hand, when user A does not want to obtain the statement content, user A selects this statement number and clicks "erase".

Referring to FIG. 16 again, the selection instruction content is notified to the web control unit 15 in the HTTP protocol. The media log managing unit of the PoC control unit 10 reproduces media data to be obtained, following the instructions, and transmits the reproduced media data to the RTP control unit 13. The RTP control unit 13 controls the RTP bridge 12 to transmit the media data to only the PoC-matched terminal A. On the other hand, the media log managing unit deletes the media data that is not required to be obtained, from the media log database 14. When the web function is used in this way, the user can use various options. Therefore, a detailed PoC service having high quality can be provided.

Figure 19:
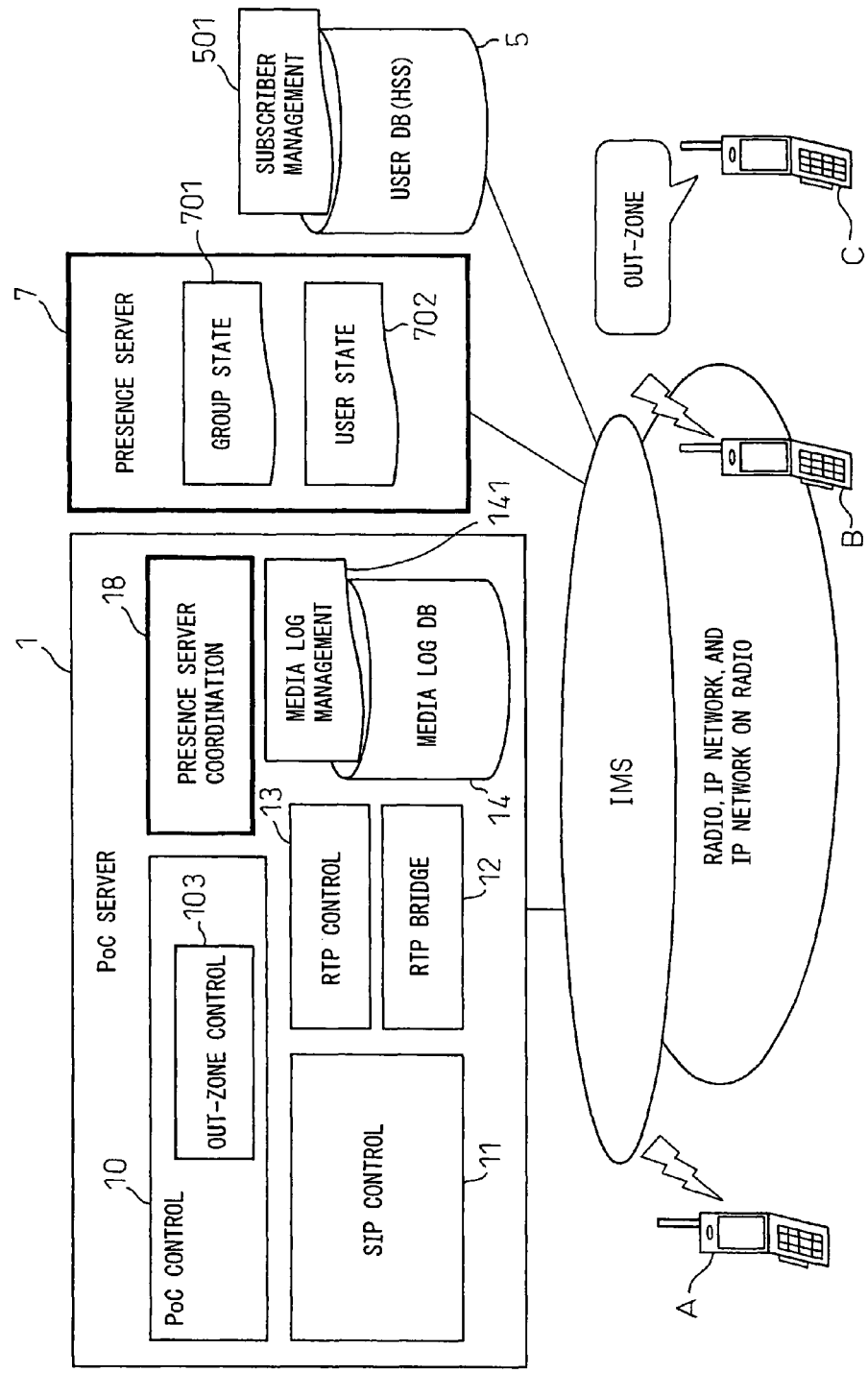
FIG. 19 is a view showing a third embodiment of the present invention.

FIG. 19 shows a PoC server and a PoC service system using the same according to a third embodiment of the present invention.

In the present example, a presence server 7 is added to the configuration of the PoC server 1 shown in FIG. 2, and a presence server coordinating unit 18 is added to the inside of the PoC server 1. Group state table 101 and user state table 102 in PoC control unit 10 shown in FIG. 2 are transferred to the inside of the presence server 7 as a group state table 701 and a user state table 702.

According to the present example, the presence server 7 is prepared separately from the PoC server 1. The presence server 7 carries out batch management of the group state and user state, thereby confirming the absence or presence of participating users. The presence server 7 notifies the current user state or its state change to the PoC server 1 autonomously or at the enquiry from the PoC server 1. Based on the coordination between the PoC server 1 and the presence server 7, proper dispersion of functions and proper dispersion of load can be achieved in the provision of the PoC service. Accordingly, the PoC server 1 can be devoted to the original PoC service and the PoC accumulation service, thereby providing high-quality service even when the number of participating users increases.

Figure 21:
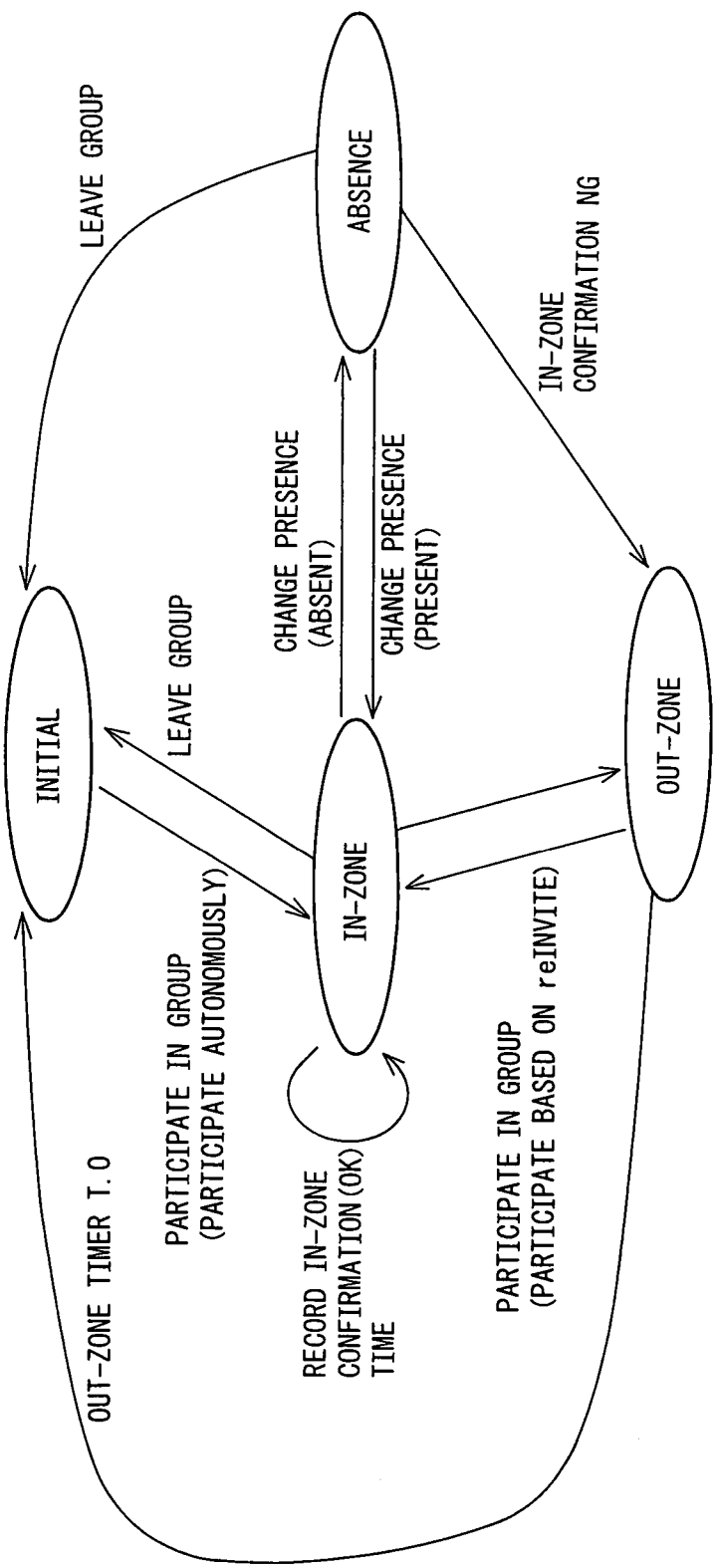
FIG. 21 is a view showing one example of a state transition diagram including an absent state.

FIG. 20 shows one example of the user state table 702 provided in the presence server 7. An "absent" state is added to the user state table 702, as compared to the user state table 102 shown in FIG. 3C. FIG. 21 shows a state change diagram containing the absent state. As shown in FIG. 21, the presence server 7 manages the user state (presence) in four states including: a state in which a user is not participating in the group, i.e., an "initial" state (offline); a state in which a user is participating in the group, i.e., a "present" state (online); a state in which a user is participating in the group, but is outside the radio area, i.e., an "out-zone" state; and a state in which a user is participating in the group, but cannot listen to the conversation, i.e., an "absent" state. The presence server 7 confirms the in-zone of these user states.

The difference between the state change in the present example and the state change shown in FIG. 5 explained above is explained. First, changes of the initial state, in-zone state, and out-zone state are the same as those shown in FIG. 5. In the present example, in order to decrease the load of the PoC server 1, the presence server 7 can periodically carry out confirmation of the in-zone of all users (health check), thereby notifying out-zone detection to the PoC server 1. In the present example, each user can freely change the presence at the user's will, if the user is in the in-zone state. For example, when there is a situation in that a user cannot listen to the statements made by other participating users, the user can change its own state to an absent state, and return the state to the in-zone state thereafter.

When a user's state changes from the absent state to the in-zone state, the user can then obtain the content of statements made by other users during the absent period, in a similar manner to when the user participates in the group from the out-zone. When the user changes the user's presence (absence or presence), the user in the in-zone personally notifies this change to the presence server 7 via the PoC server 1. When a user changes from the absent state to the out-zone state or the initial state, this change is executed in a process similar to that applied to a change from the in-zone state to the out-zone state or the initial state (see FIG. 6).

Figure 23:
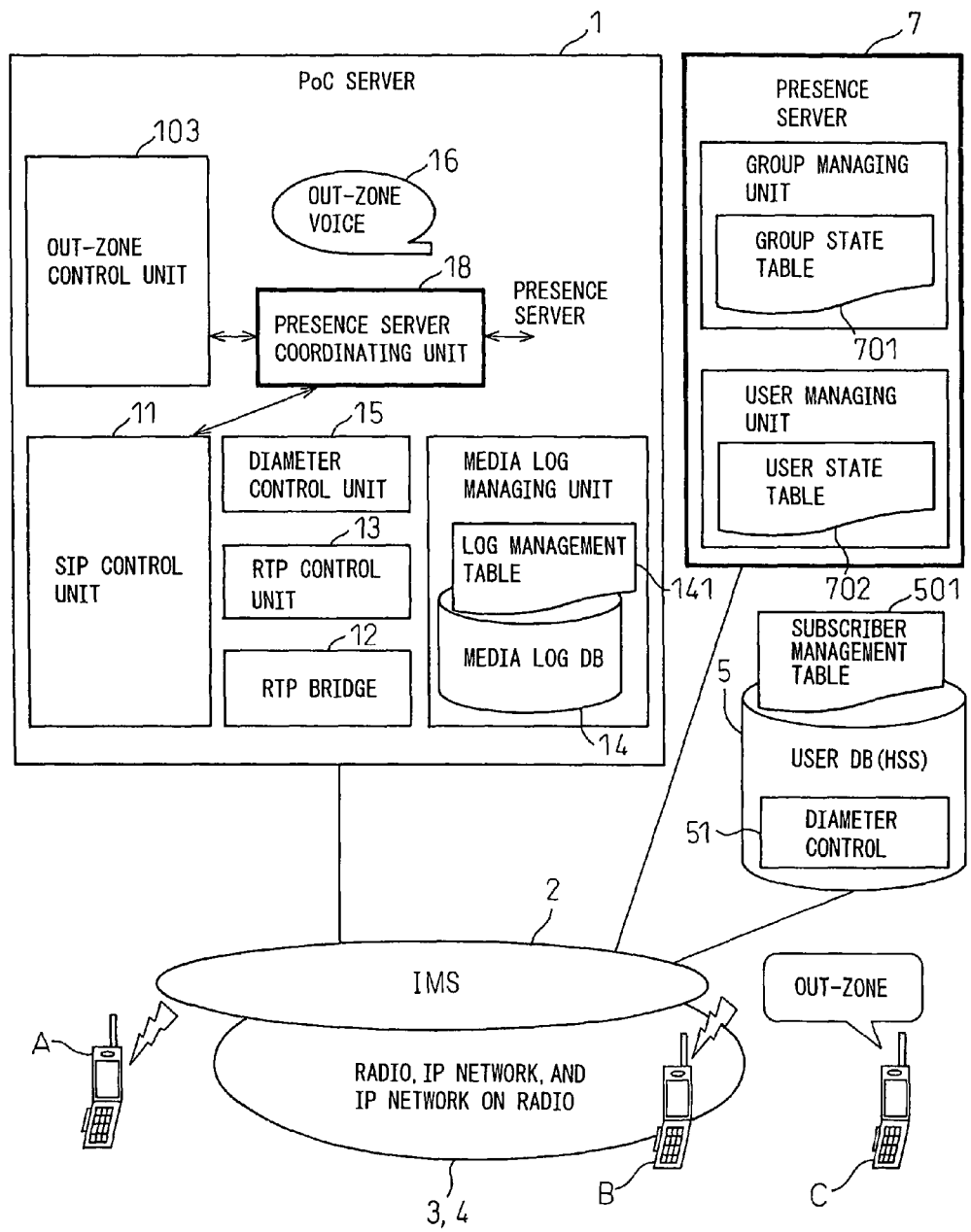
FIG. 23 is a view showing a detailed configuration example of the PoC server 1 shown in FIG. 19.

FIG. 22A and FIG. 22B show one example of a media log deletion sequence when all participating users are present. FIG. 23 shows a more detailed configuration example than that of the PoC server 1 in the present example. Detailed operations carried out between the blocks shown in FIG. 23 are similar to those explained above with reference to FIG. 8, except the operations of the presence server 7 and presence server coordinating unit 18.

In FIG. 22A, the process from when users A to C establish a PS link with the packet exchange network 2 until users A to C participate in the PoC group (S41 and S42) is similar to that when there is no presence server (S01 and S02 in FIG. 7A). However, in the present example, a request for changing the presence (in-zone) from a participating user is sent from the PoC server 1 to the presence server 7 via the presence server coordinating unit 18 (S43). The presence server coordinating unit 18 uses a SIMPLE (SIP for Instant Messaging Presence Leveraging Extensions) protocol, to coordinate with the PoC service 1. The presence server 7 manages the in-zone and out-zone state of a user, using group state table 701 and user state table 702.

In the present example, user C obtains the floor by depressing the PTT button of the PoC-matched terminal C (S44). The content of statement made by user C is converted into a RTP packed inside the PoC-matched terminal C, and the RTP packet is transmitted to the PoC server 1. The RTP control unit 13 transmits the received media information to the media log managing unit. The media log managing unit accumulates the media information into the media log database 14. The RTP control unit 13 also multicasts the received RTP packet to participating users A and B within the same group, via the bridge 12.

In the present example, the presence server 7 updates the user state table 702 by periodically confirming the in-zone of users (FIG. 19). Specifically, the presence server 7 requests the SIP control unit 11 to transmit the reINVITE message via the presence server coordinating unit 18. Upon receiving this transmission request, the SIP control unit 11 periodically transmits the reINVITE message to each participating user, and notifies a response confirmation content to the presence server 7 via the coordinating unit 18. As an alternative method of confirming the user in-zone state, the presence server 7 can confirm the in-zone of a user by periodically transmitting a PING command to each user terminal. In this case, the presence server 7 by itself can confirm the user in-zone state, thereby further decreasing the load of the PoC server 1.

Upon being notified of the presence of accumulated media data from the media log managing unit, the out-zone control unit 103 periodically polls the presence server 7 about the user state via the presence server coordinating unit (S47). The out-zone control unit 103 does not control the SIP control unit 11 in this case. When all users are in the in-zone state as a result of the enquiry, the out-zone control unit 103 requests the media log managing unit to delete the corresponding media log. The media log managing unit deletes the requested media log (S48). As in the first embodiment (FIGS. 7A to 10), all log data files of all users who are in the in-zone state before the oldest confirmation time are deleted from the media log database 14. When all users are in the initial state, all the log data files are forcibly deleted.

Figure 24A:
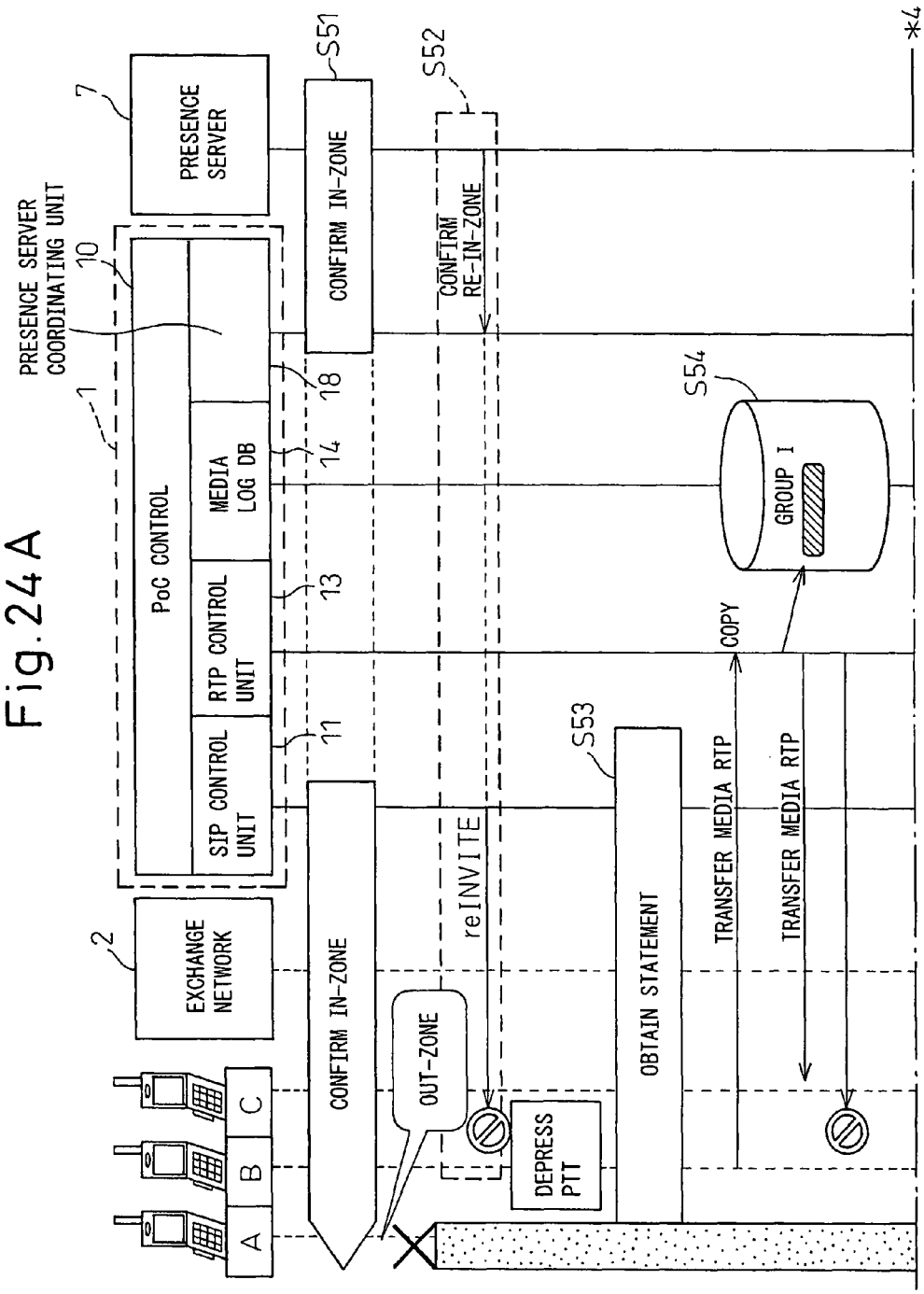
FIG. 24A is a view showing one example (1) of a media log deletion sequence when a participating user is in the out-zone.

FIGS. 24A and 24B show one example of a media log deletion sequence when a participating user is in the out-zone state. The process until when users A to C participate in group I is similar to that at S41 to S43 shown in FIG. 22A, and, therefore, is not shown in FIG. 24A. Detailed operations carried out between the blocks shown in FIG. 23 are similar to those explained above with reference to FIG. 8, except the operations of the presence server 7 and the presence server coordinating unit 18.

In the present example, the process starts from the following operation. During the confirmation of the in-zone state of users led by the presence server, when the first re-INVITE which the SIP control unit 11 transmits to user A times out, the SIP control unit 11 notifies this effect to the presence server 7 via the presence server coordinating unit 18 (S51). In this case, the presence server 7 sets user A in the user state table 701 to the out-zone state, and instructs the out-zone control unit 103 to confirm that user A is in the in-zone state again, via the presence server coordinating unit 18. Upon receiving this instruction, the out-zone control unit 103 makes the SIP control unit 11 start confirmation processing of the re-in-zone state (S52). In the present example, user B makes a statement during the confirmation of the re-in-zone state, and the PoC server 1 accumulates the content of this statement (S53 and S54).

Accordingly, the out-zone control unit 103 receives a notification of the presence of accumulated media data from the media log managing unit, and periodically polls the presence server 7 about the user state via the presence server coordinating unit 18. Because user A is in the out-zone state, the out-zone control unit 103 does not request the media log managing unit to delete the media log (S55 and S56).

Upon receiving the 200OK message from user A who has moved to the in-zone before the out-zone timer times out, the SIP control unit 11 notifies this effect to the presence server 7 via the presence server coordinating unit 18. The presence server 7 receives this notification, updates user A in the user state table, and notifies the re-in-zone state of user A to the out-zone control unit 103 via the presence server coordinating unit 18 (S57). When the user moves from the out-zone state to the in-zone state, or when the user shown in FIGS. 25A and 25B changes from the absent state to the in-zone state (including the present state), the presence server 7 notifies the in-zone state of the user and the final confirmation time necessary for the process during the re-n-zone state shown in FIG. 12, to the out-zone control unit 103.

The out-zone control unit 103 extracts a media log during a period from the final confirmation time of the out-zone detection time of user A until the current time, based on the time of the media log in the media log management table 141. The out-zone control unit 103 instructs the media log managing unit to reproduce the extracted media log data. The media log managing unit transmits the reproduced data to the RTP control unit 13. The RTP control unit 13 transmits the reproduced data to only user A via the RTP bridge 12. The media log managing unit deletes the transmitted media log data from the media log database 14 (S58 and S59).

Regarding the transmission of the reproduced data, user A can select only media data which user A wants to receive, using the web function according to the second embodiment in combination. In the present example, the PoC server 1 executes the re-in-zone detection processing. When the presence server 7 has a function of periodically transmitting a PING command to each user terminal or an out-zone timer, the presence server 7 by itself can execute the re-in-zone detection process. Accordingly, load on the PoC server 1 can be decreased.

FIGS. 25A and 25B show one example of a media log deletion sequence when a participating user is absent or present. In the present example, the sequence operation until when users A to C participate in group I is similar to that shown at S41 to S43 in FIG. 22A. Detailed operations between the blocks shown in FIG. 23 are similar to those explained with reference to FIG. 8, except the operations of the presence server 7 and the presence server coordinating unit 18.

In the present example, when present user A depresses an absence button provided at the PoC-matched terminal A or clicks an absence button displayed on the terminal screen, a change of the state of user A (absence) is notified to the presence server 7 via the PoC server 1 (S61). Accordingly, the presence server 7 sets user A in the user state table 702 to the absence. There is no particular prescription regarding a change (absence or presence) of presence, and a change of a parameter contained in the SIP message can be used, for example. In the present example, user B makes a statement thereafter, and the content of the statement is accumulated in the media log database 14 (S62 to S63). In this case, absent user A cannot receive an RTP packet transmitted from the PoC server 1.

The out-zone control unit 103 of the PoC server 1 is started based on the presence of a media data file, and request the presence server 7 to confirm the user state via the presence server coordinating unit 18. In the present example, the presence server 7 notifies the absence of user A (S64). The state of absence is processed in a similar manner to that of the state of out-zone. Therefore, the media log data file accumulated in the media log database 14 is not deleted (S65). This is because the state of absence can be regarded to be the same as the state of out-zone in that the media information cannot be notified to all users.

Accordingly, when user A depresses a presence button provided at the PoC-matched terminal A or clicks a presence button displayed on the terminal screen, a change of the state of user A (presence) is notified to the presence server 7 via the PoC server 1. The presence server 7 sets user A in the user state table 702 to the presence, and notifies this effect and a confirmation time of this setting to the out-zone control unit 103 of the PoC server 1 via the presence server coordinating unit 18 (S65). The out-zone control unit 103 executes the same process as the re-in-zone process (see FIG. 12) (S66 and S67).

Although not shown in the drawing, while user A is absent, the in-zone confirmation process (periodical transmission of the reINVITE message) is carried out in a similar manner to that when user A is in the out-zone state. When a response to the first reINVITE message times out, the state of user A changes to the out-zone state (see FIG. 21). In the present example, the user can freely obtain the content of statements made by other participating users.

Figure 26:
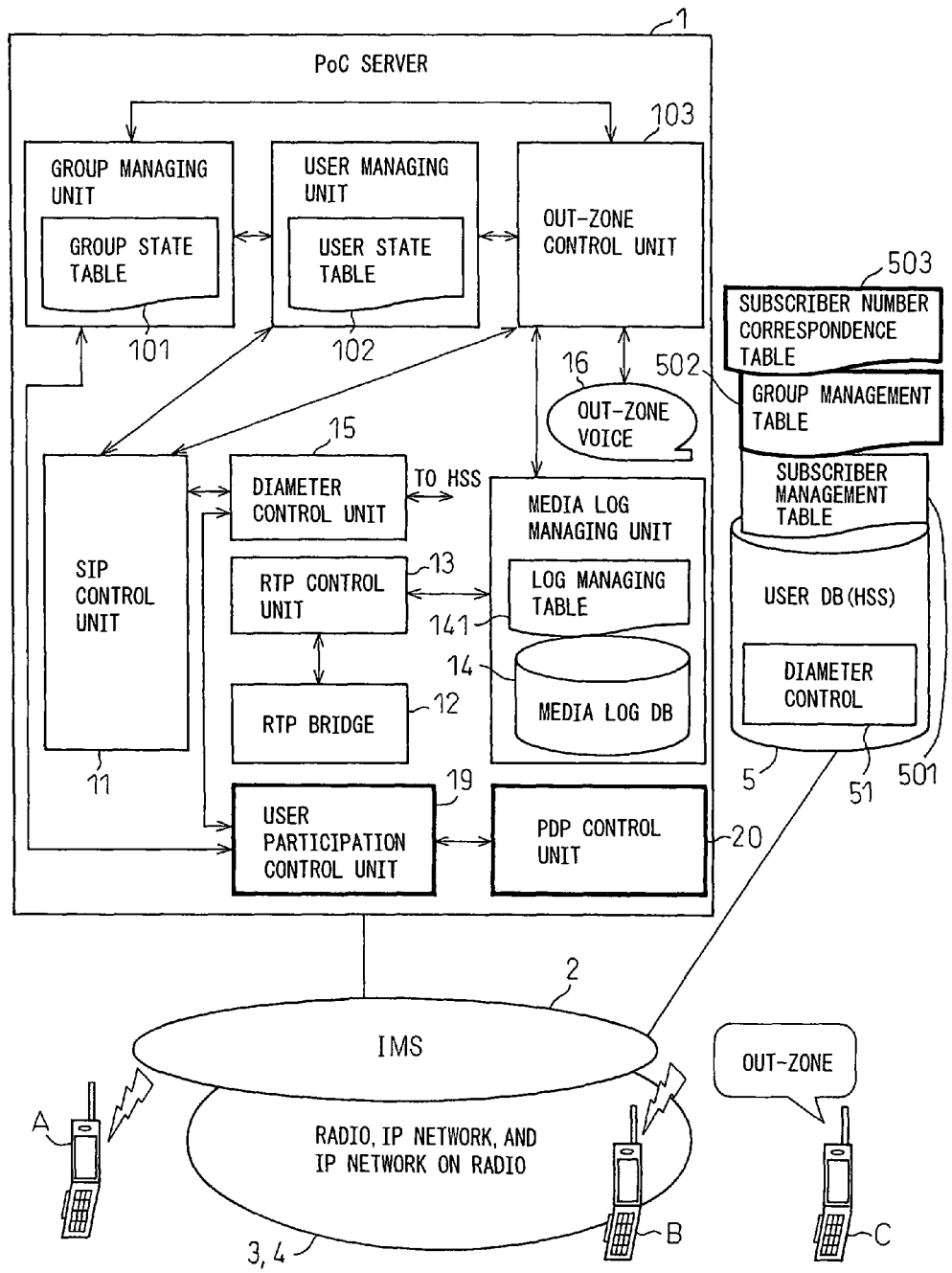
FIG. 26 is view showing a fourth embodiment of the present invention.
Figure 27A:
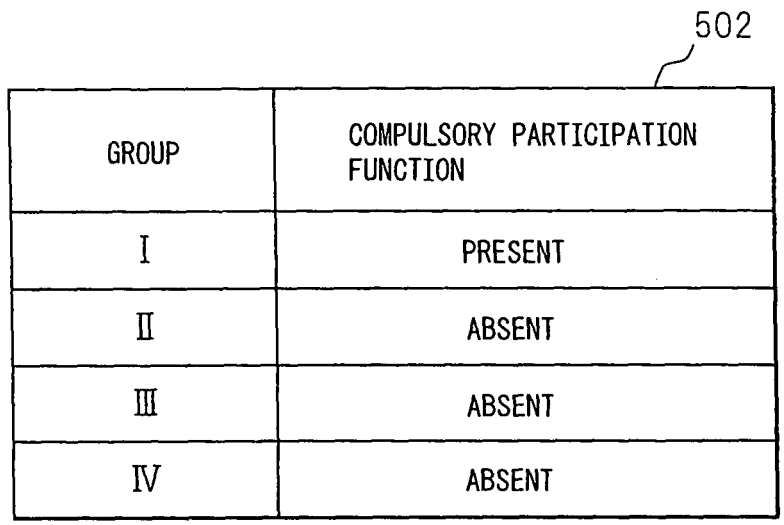
FIG. 27A is a view showing one example of a group management table.
Figure 27B:
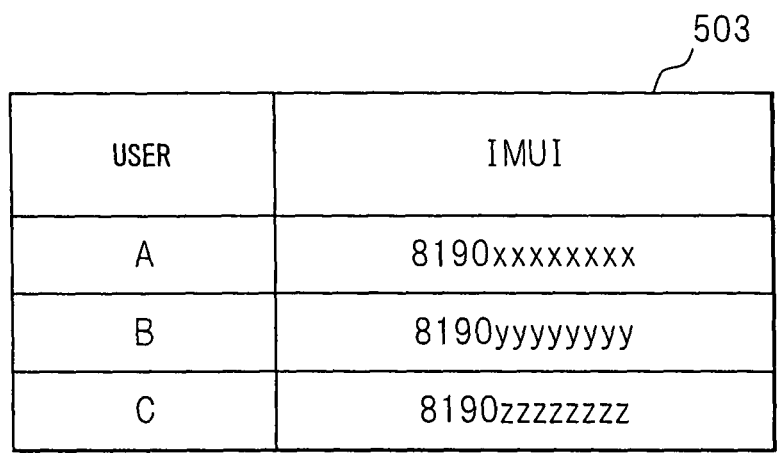
FIG. 27B is a view showing one example of a subscriber number correspondence table.

FIG. 26 shows a detailed configuration example of the PoC server 1, according to a fourth embodiment of the present invention. FIGS. 27A and 27B show an example of a group management table and a subscriber number correspondence table, respectively. According to the embodiments explained above, when a user first participates in the PoC service (group), the user needs to wait until another user autonomously participates in the same group. In order to avoid this situation, in the present example, when a specific user participates in the PoC group, other users of the same group are requested to participate in this group.

The configuration shown in FIG. 26 is different from that shown in FIG. 8 in that a user participation control unit 19 and a PDP (Packet Data Protocol) control unit 20 are added to the PoC server 1 shown in FIG. 26, and that only a group management table 502 and a subscriber number correspondence table 503 are added to the user database 5 shown in FIG. 26. Other configurations are similar to those explained with reference to FIG. 8, and therefore, are not explained hereafter.

In FIG. 26, the PDP control unit 20 carries out communication control using the PDP protocol, with a GGSN (Gateway GPRS Support Node, GPRS: General Packet Radio Service) etc., within a core network including the PS (Packet Switch). In the present example, the PDP control unit 20 requests the GGSN to transmit a packet to a predetermined user in a PDP message. The GGSN receives this request, and requests the PS and others to establish a packet data transfer link between the core network 2 and the user.

When the group managing unit coordinating with the user managing unit notifies the user participation control unit 19 concerning detection of a participating user and a group in which the user participates, the user participation control unit 19 accesses the user database 5 via the DIAMETER control unit 15, and obtains necessary data from the group management table 502 and the subscriber number correspondence table 503 in the user database 5. In this example, the user participation control unit 19 obtains information about whether the group has a user compulsory participation function from the group management table 502. When the group has a user compulsory participation function, the user participation control unit 19 obtains a terminal user identifier IMUI (International Mobile User Identity) that uniquely specifies other users in the same group from the subscriber number correspondence table 503. Accordingly, the user participation control unit 19 notifies a request for transmitting a packet to the user, to the PDP control unit 20.

FIG. 27A shows one example of the group management table 502. In the present example, only group I has the compulsory participation function. When any one user of group I participates in this group, other users of the same group are requested to participate in the group. FIG. 27B shows one example of the subscriber number correspondence table 503. In the present example, a call-arrival user is specified using the terminal user identifier IMUI. Alternatively, the telephone number of the call-arrival user can be also used. While the compulsory participation function is given to each group in the present example, this can be given to each specific user. In this case, only when a specific user (a group leader or the like) of group I participates in the group, other users in the same group can be requested to participate in the group.

Figure 29:
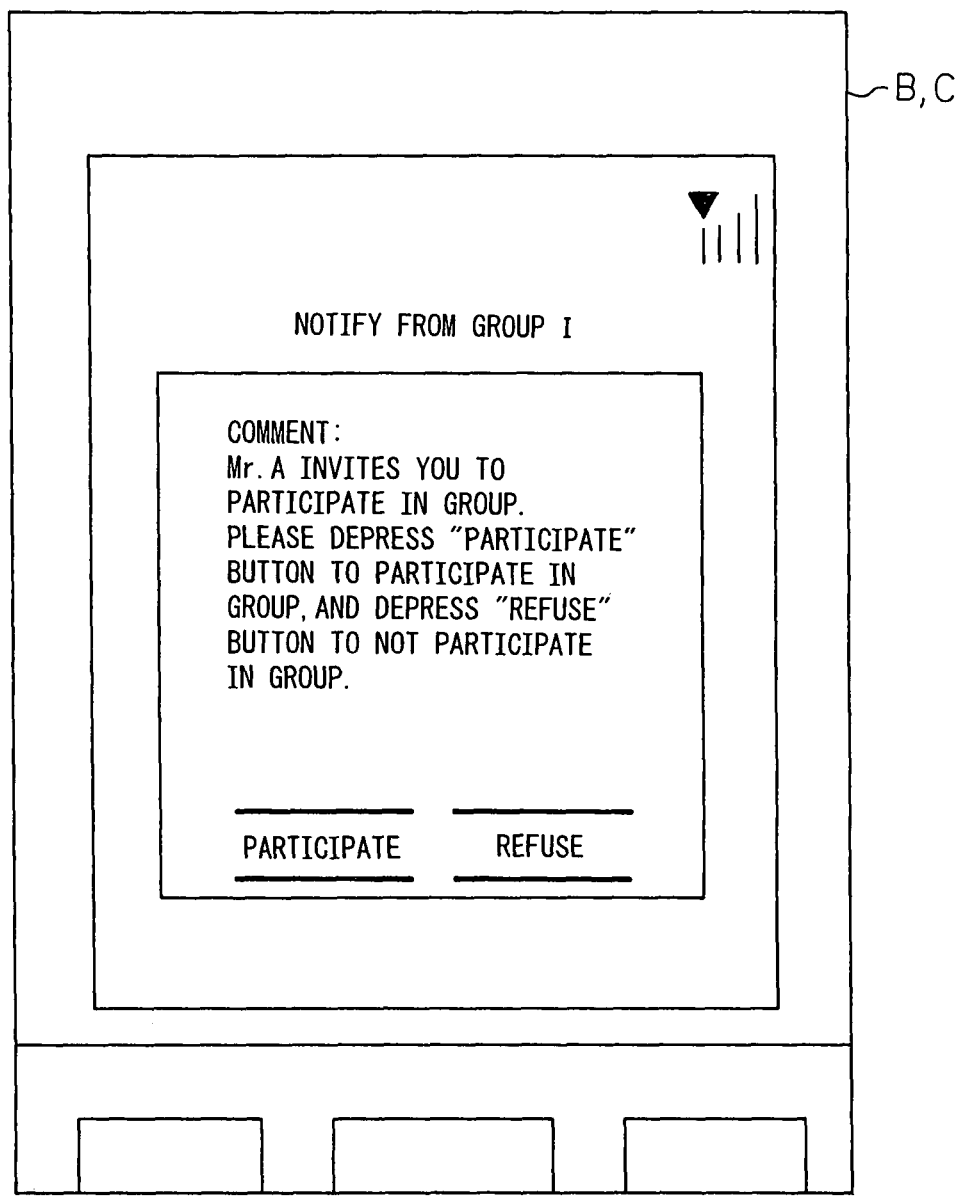
FIG. 29 is a view showing one example of a terminal display screen at a participation request time.

FIGS. 28A and 28B show one example of a sequence of making users B and C compulsively participate in the group when user A participates in the PoC group. FIG. 29 shows one example of a display screen of the PoC-matched terminals B and C of which users are requested to participate in the group. In the present example, group I has a compulsory participation function, and users A, B, and C can participate in group I.

In FIG. 28A, only user A first establishes a PS link with the packet exchange network 2, and participates in the PoC group I (S71 and S72). Upon receiving a notification from the group managing unit that user A has participated in the group I, the user participation control unit 19 of the PoC server 1 accesses the user database via the DIAMETER control unit 15, and obtains information that group I has the compulsory participation function from the group managing unit 502 (FIG. 27A), and the information of the terminal user identifier IMUI (FIG. 27b) information of users B and C in the same group from the subscriber number management table 503. Accordingly, the user participation control unit 19 instructs the PDP control unit 20 a request for a packet arrival to B and C (S73).

Upon receiving this instruction, the PDP control unit 20 transmits the GGSN of the core network 2 a request message of a packet arrival (PDP PDU (Protocol Data Unit) message) to users B and C (S74). As shown in the drawing, information elements of the PDP PDU message include a service type (PoC call arrival), the IMUI, the IP address and the port number of the PoC server 1, and the participation group ID (group I). The PS in the core network 2 establishes a packet data transfer PDP Context to users B and C at the request of the GGSN (S75). In this case, data content of the information elements of the PDP PDU message is notified to PoC-matched terminals B and C.

Upon receiving this notification, PoC-matched terminals B and C starts an APL (Application Program Loader), and displays a browser screen shown in FIG. 29. The B and C choose either a "participate" button or a "leave" button to participate in or leave the group I, and click the selected button. FIG. 29 shows an example in that both users B and C participate in group I. Users B and C participate in group I in a process similar to that explained with reference to FIGS. 14 and 15 (S76 and S77). As explained above, according to the present example, participation in the group can be automatically requested to other users without waiting for autonomous participation of the other users. Therefore, important information can be easily transmitted to a group conference or group members, and the PoC service based one-to-one audio communication can be carried out more effectively.

FIG. 3 graphically shows one example of a general teleconference system.

The present example shows a multi-point bidirectional teleconference system provided by a telecommunication business provider on the IP network, such as a virtual conference room in which a small number of users carry out a simple meeting, using, personal computers (hereinafter, "PCs").

Figure 30:
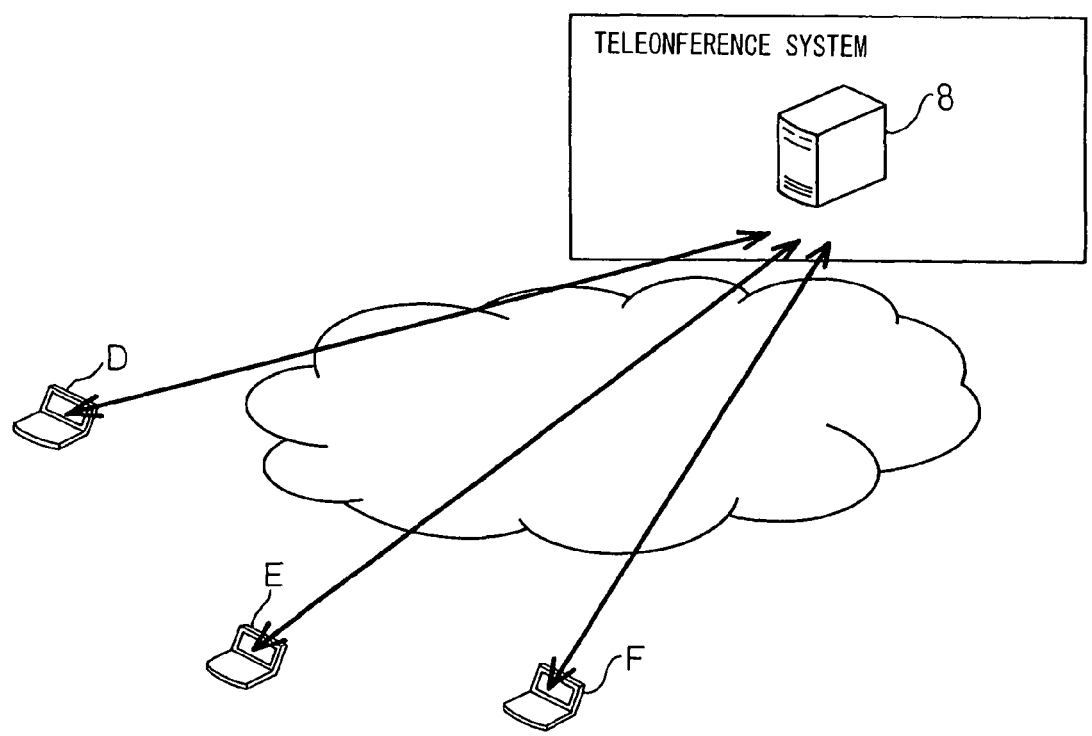
FIG. 30 is a view schematically showing one example of a teleconference system.

In FIG. 30, teleconference client terminals (PC terminals) D, E, and F access a virtual conference room in which a telecommunication business provider provides in a teleconference server 8 within a network. In the teleconference server 8, teleconference server software continuously operates, and the teleconference server 8 connects the client terminals (PC terminal) D, E, and F in a star arrangement, using an MCU (Multi-point Conference Unit) within the server. Based on this configuration, efficiency of using the communication line increases, and consolidated management of the conference room is achieved.

On the other hand, client terminals D, E, and F start each teleconference client software, and access the teleconference server 8. A communication link is established between the teleconference server 8 and each client terminals D, E, and F, using the SIP protocol. In this teleconference system, the content of the conference is streamingly delivered to each participant of the conference in real time through the MCU on the teleconference server 8.

Figure 31:
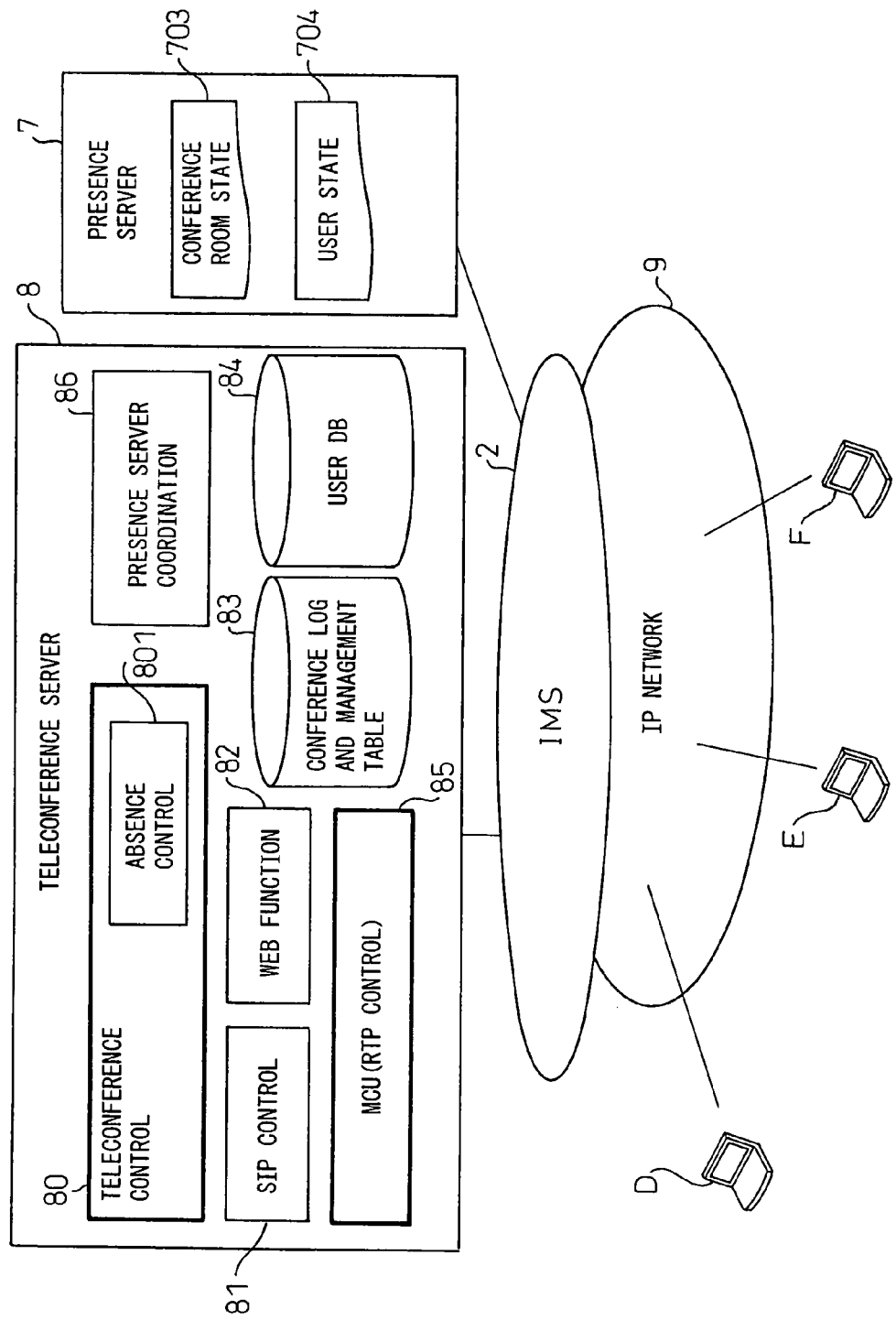
FIG. 31 is a view showing a fifth embodiment of the present invention.

FIG. 31 shows a fifth embodiment of the present invention.

The present example is the application of the above mechanism of various kinds of PoC service system according to the present invention, to the teleconference system. In the present example, the configuration of the PoC service system is similar to that of the third embodiment. The teleconference server 8 coordinates with the presence server 7 via a presence server coordinating unit 86. The presence server 7 collectively manages a conference room state table 703 and a user state table 704.

The presence server 7 notifies the current user state or its state change to the teleconference server 8 autonomously or at an enquiry from the teleconference server 8. Based on coordination between the teleconference server 8 and the presence server 7, proper dispersion of functions and proper dispersion of load can be achieved in the provision of the teleconference service. Accordingly, the teleconference server 8 can be devoted to the original service, thereby providing high-quality service even when the number of participating users increases.

In the present configuration, as described above, client terminals (PC terminals) D, E, and F are combined in a star arrangement, efficiency of using the communication line is increased, and consolidated management of the conference room is achieved, using an MCU 85. The MCU 85 includes an RTP control unit. An absence control unit 891 of the teleconference control unit 80 accumulates information upon recognizing a user leaving the room (absence), and reproduces the accumulated information according to when the user participates in the conference again.

When a web function 82 is used, a use who wants to participate in the conference can assign participation in the conference at the web portal site. A user who participates in the conference can make a statement or listen to statements of other participants. The IP network 9 in the present example is not limited to radio networks 3 and 4 for the PoC service, and can be fixedly connected by a radio network. In the present example, the IP network 9 according to the radio fixed connection is used. Other configurations are similar to that shown in FIG. 19.

FIG. 32A to 32C show one example of a statement table and a log management table used in the present embodiment.

The conference room state table 703 provided within the presence server 7 is processed in a similar manner to that of the group state table 101 (FIG. 3B) of the PoC service (see FIG. 33 described later). The user state table 704 does not have a state of "out-zone", unlike the user state table (FIG. 20) used in the embodiment of the PoC service using the presence server 7, because the IP network 9 according to the radio fixed connection is used (see FIG. 34 described later).

A reference log management table 83 provided in the teleconference server 7 is processed in a similar manner to that of the media log management table 141 (FIG. 3D) of the PoC service (see FIGS. 36 to 39 described later). In the present example, participation of an unspecified person in the conference is also assumed. Therefore, the subscriber management table 501 (FIG. 3A) of the PoC service is not specifically provided. Participants in the conference are managed using a user database 64.

Figure 33:
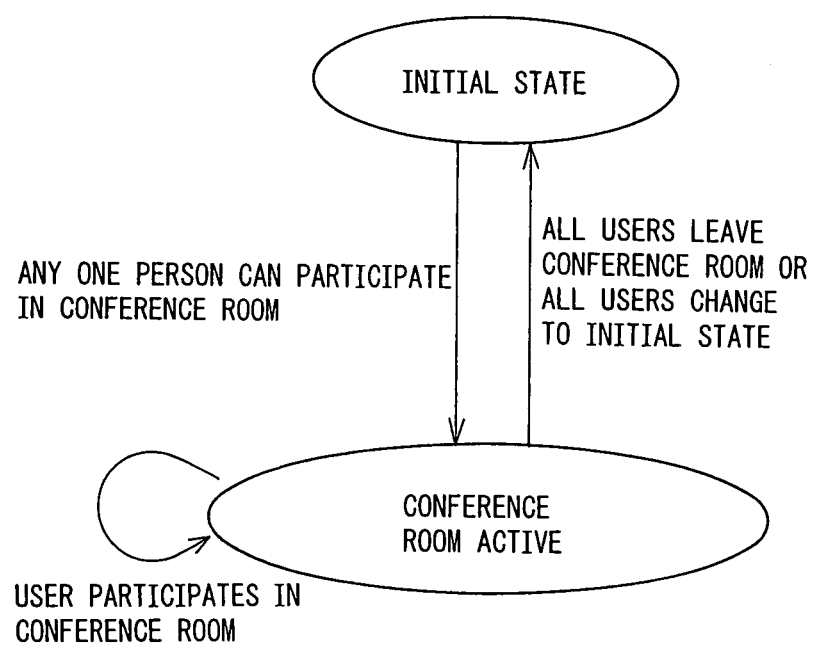
FIG. 33 is a view showing one example of a conference room state transition.

FIG. 33 shows a transition of a conference room state, and corresponds to FIG. 4 of the PoC service.

In this case, the process is carried out in a similar manner to that of the PoC service. In the beginning, none of the users are participating in the service, and therefore, the state of the conference room is in the initial state. When at least one person participates in the conference room, the state of the conference room changes from the initial state to the active state. While the conference room is in the active state, participation of another user in the conference room does not change the state of the conference room. When all participating users leave the conference room or change to the initial state, the conference room returns to the initial state.

Figure 34:
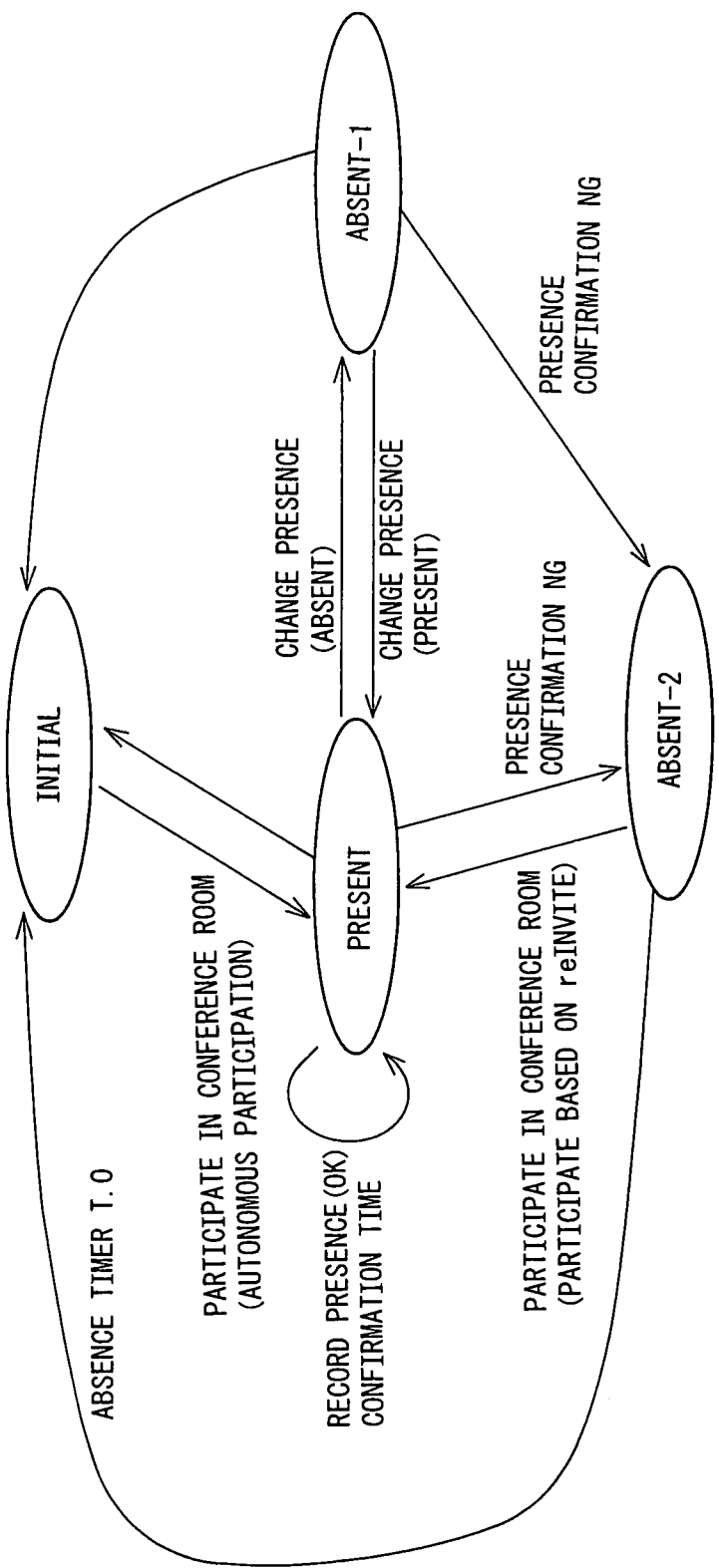
FIG. 34 is a view showing one example of a user state transition.

FIG. 34 shows a transition of a user state including an absence state, and corresponds to FIG. 21 of the PoC service.

In FIG. 34, the presence server 7 manages the user state (presence) in the following four states including: a state in which a user is not participating (absent) in the conference room, i.e., an "initial" state (offline); a state in which a user is participating in the conference, i.e., a "present" state (online); a state in which a user is participating in the conference room, but is on the outside of the conference room based on a user's own decision, i.e., an "absent-1" state; and a state in which a user is participating in the conference room, but cannot listen to the statements in the conference, i.e., an "absent-2" state. The presence server 7 confirms the presence in these user states, in the present example.

The "absent-1" state refers to a case in which the user personally instructs "absent" to the web portal site using the web function 82. The state enters "absent" immediately after this instruction is notified to the absence control unit 801. On the other hand, the "absent-2" state refers to a case in which the user is participating in the conference, but the presence server 7 detects that the user is "absent" due to trouble in the line of the IP network 9 or congestion. Because the absence process is executed in both the "absent-1" state and the "absent-2" state, both states are managed as one "absent" state in the user state table 704. Detailed conditions of the state change are similar to those shown in FIG. 21.

Figure 35:
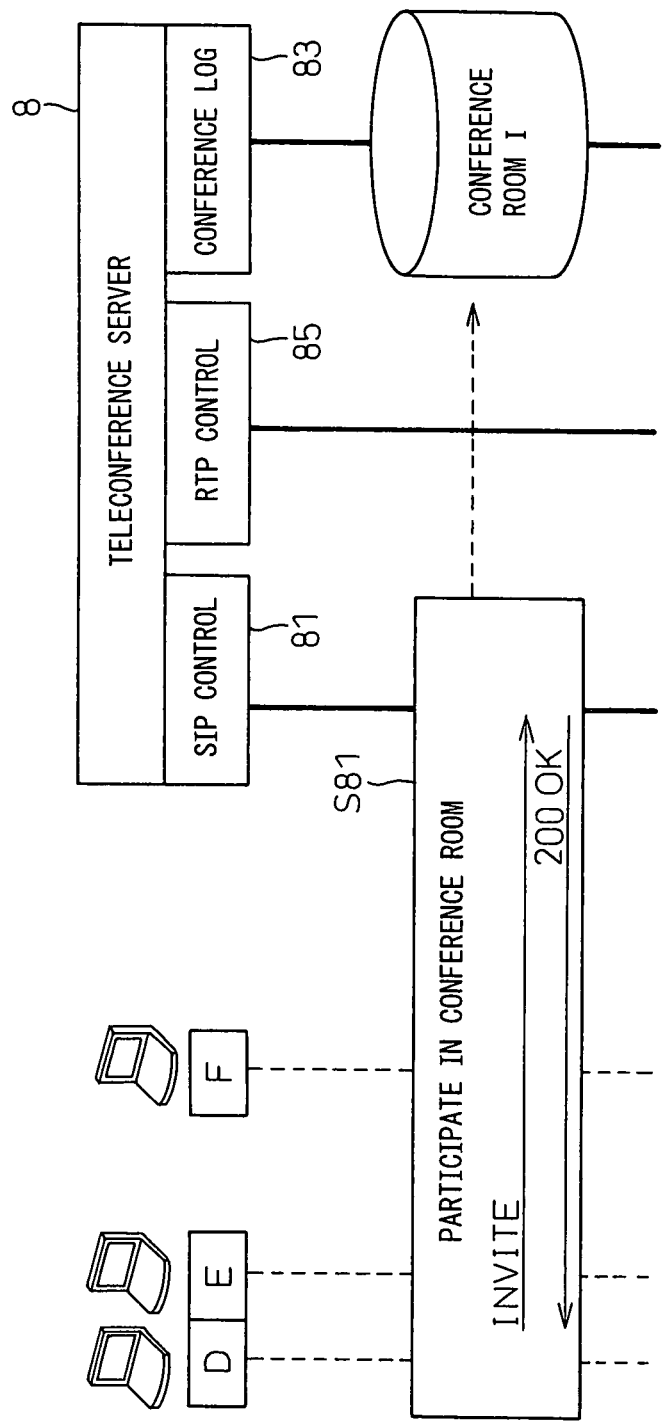
FIG. 35 is a view showing one example of a conference participation sequence.

FIG. 35 shows one example of a conference participation procedure.

A user in the present example is fixedly connected to the IP network 9, and therefore, the INVITE message is transmitted to the teleconference server 8 when the user participates in the conference (S81). In this case, the web browser can be used in the procedure as shown in FIGS. 14 and 15 of the PoC service.

A detailed flow of the processing sequence after the user participates in the conference is the same as that shown in FIGS. 7A and 7B (when all the users are present in the present example), FIGS. 11A and 11B (when there is an absent user in the present example), and FIG. 16 (when the user is present again in the present example), in the PoC service. Details of the above operations are as explained with reference to the drawings above, and only the outline operation of the teleconference service is briefly explained below.

Detection of absence of a user and recording during the absence of a user are carried out as follows: (1) the teleconference server 8 records the conference (streaming information including both audio and video information) when all the scheduled participants in the conference are not present at the beginning of the conference; (2) when there are responses from all participants in the conference, accumulated information is deleted; and (3) the television conference server 8 records the time when the user is absent.

Reproduction control during detection of presence of a user is carried out as follows: (1) when a user temporarily absent returns and participates in the conference once again, the teleconference server 8 enquires whether the information during the absence of the user is to be reproduced; (2) when the information during the absence of the user is necessary, necessary information is transmitted again to only this user; and (3) when the information during the absence of the user is necessary and also when there is no user who requires accumulation of the information, the information is abandoned. The above operations are basically unchanged from those of the PoC service.

A representative processing flow of the teleconference service according to the present invention is briefly explained below. This processing flow is also similar to that of the PoC service. Detailed operations are as explained above for the PoC service with reference to the drawings.

Figure 36:
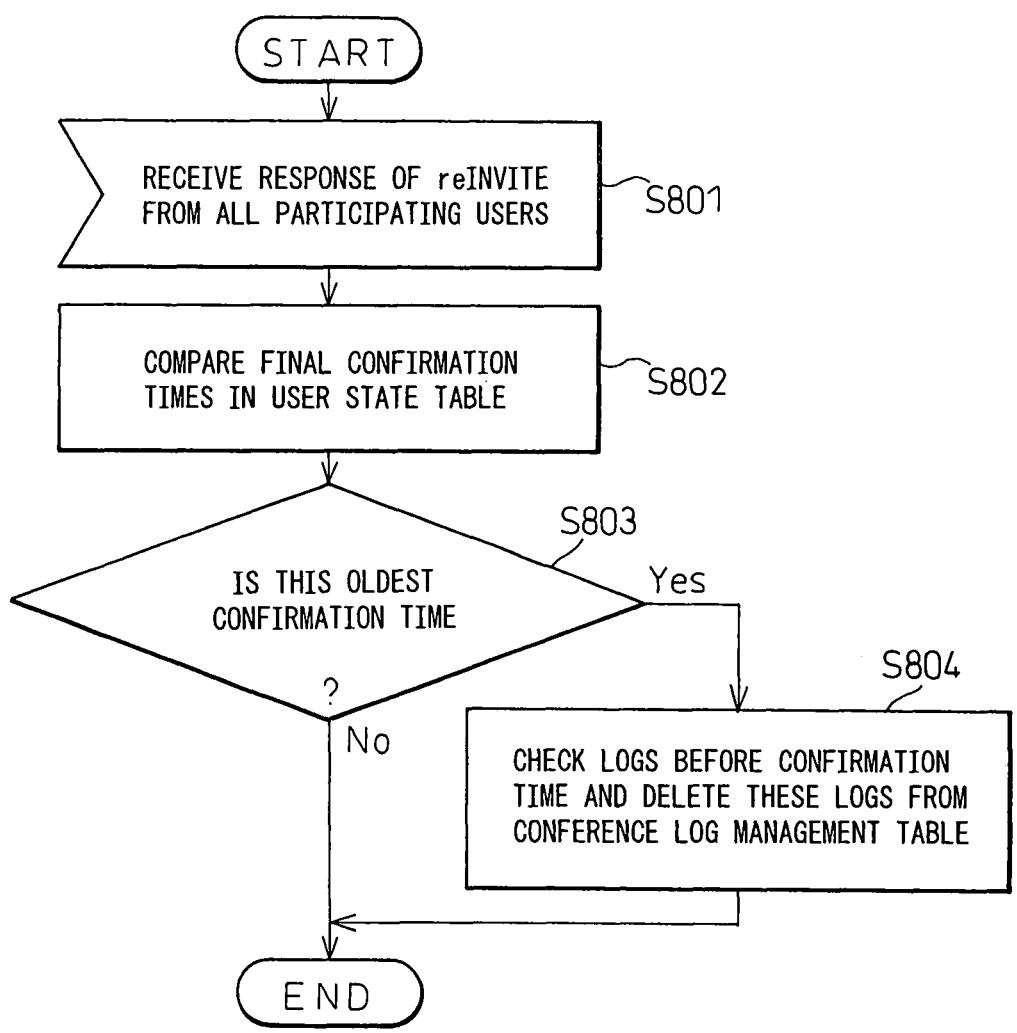
FIG. 36 is a view showing one example (1) of a deletion control flow of a conference log.
Figure 37:
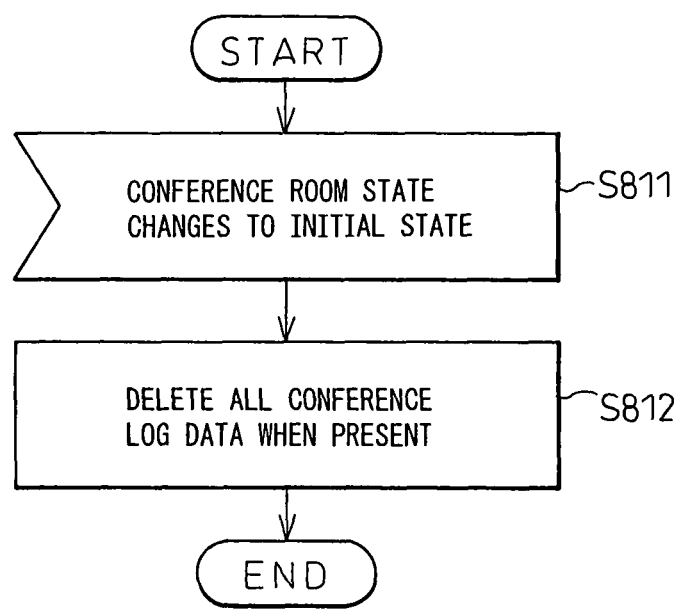
FIG. 37 is a view showing one example (2) of a deletion control flow of a conference log.

FIGS. 36 and 37 show one example of a deletion control flow of a basic conference log, and correspond to FIGS. 9 and 10 for the PoC service. In FIG. 36, log data of the conference are sequentially deleted when presence of all users is confirmed. Specifically, the absence control unit 801 is started when the conference room changes to the active state. When at least one participating user makes a statement, absence detection process of the group participation member is started.

Thereafter, the SIP control unit 81 is controlled to transmit the reINVITE message as the SIP message to each of the participating user terminals D to F at a predetermined cycle. Upon receiving the reINVITE message, each terminal returns the 200OK message in response. When the presence of all users is confirmed after receiving the reINVITE message from the participating users (S801), final confirmation times of the users recorded in the user state table 704 are compared with each other, and all conference logs 83 recorded before the oldest confirmation time are deleted (S802 and S803).

In FIG. 37, when the conference state changes to the initial state during presence of the conference log data, all conference log data held by the group are deleted, to effectively use the log area (S811 and S812).

Figure 38:
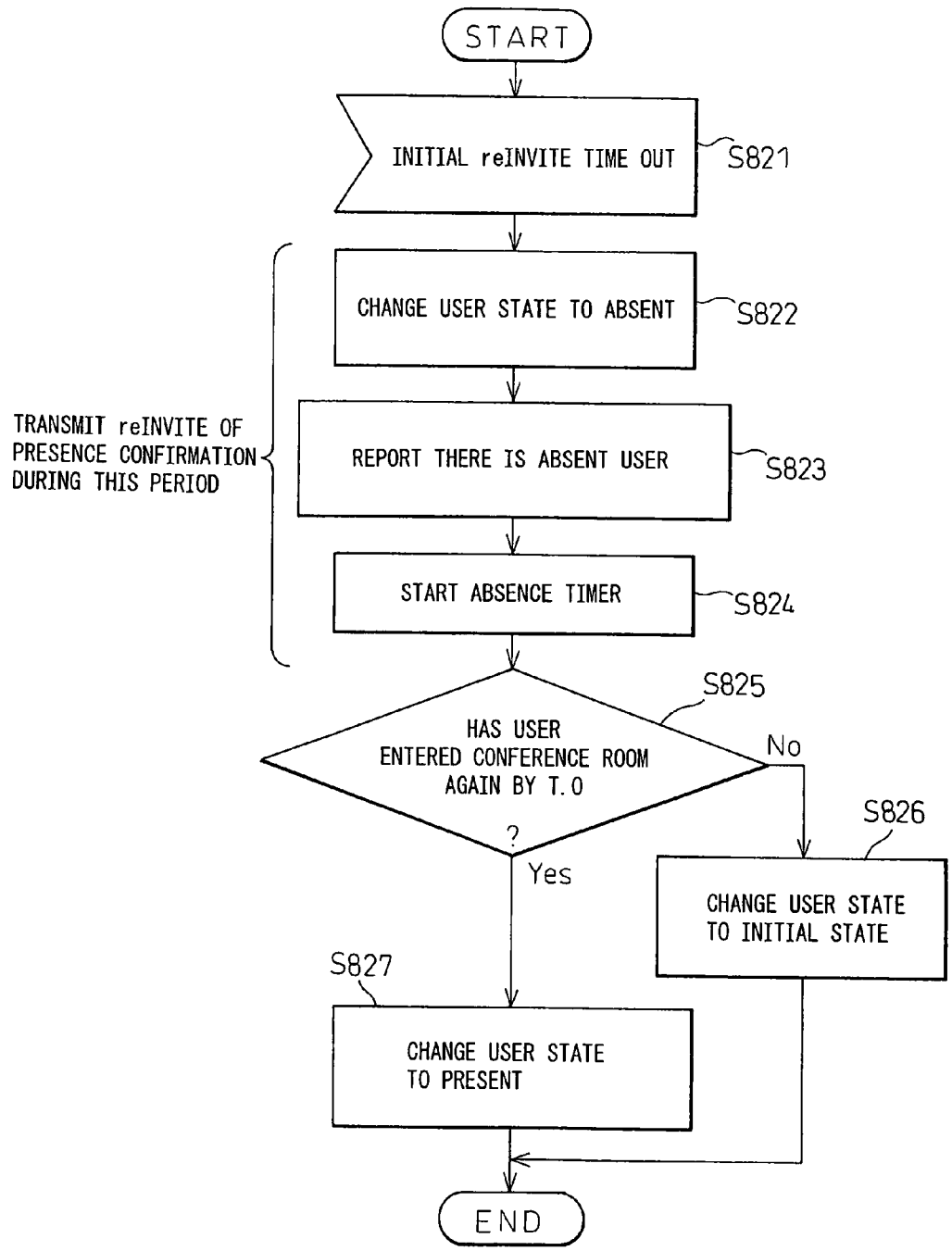
FIG. 38 is a view showing a processing flow example when an absent user is detected.

FIGS. 38 and 39 show an example of a processing flow when an absent user and a returning user are detected, and these drawings correspond to FIGS. 6 and 12 for the PC service.

In the present example, when absence of at least one participating user is detected, the conference log is not deleted. After the absent user is detected, data files in the conference log are not deleted, but temporarily stored. After the absent user enters the conference room again, data files necessary in the conference log are deleted (see FIG. 39).

Specifically, when a first timeout is detected due to no response from a certain terminal (first reINVITE T.O), the absence control unit 801 changes the state of the user of the terminal to absent ("absent-2" in FIG. 34) (S821 to S823). The absence control unit 801 reports this effect to participating users other than the absent user, and starts the absence timer (a reINVITE message transmission time of a constant number of times after the first reINVITE T.) to the absent user (S824).

The absence control unit 801 thereafter periodically transmits the re-INVITE message to the absent user within an absence timer time, thereby detecting the returning user (S825). When the user is temporarily absent within the absence timer time (when temporary congestion occurs), the absent user is changed to the present state again (S827). After the timeout, the absent user is changed to the initial state (absent). In this case, the absence timer of the absent user is stopped, and transmission of the reINVITE message to the absent user is also stopped.

In FIG. 39, upon detecting the returning user (S831), the absence control unit 801 obtains the final confirmation time of the absence from the user state table 704 before updating (S832), compares this time with the time of writing to the conference log management table 83, and extracts the conference log data accumulated after the final confirmation time of the absent user (S833). The absence control unit 801 requests the conference log managing unit to transmit the extracted data. The RTP control unit 85 transmits the transmission-requested data to only the absent user (S834).

Thereafter, in the user state table 704, the absent user is updated to "present", and confirmation time is updated to the final confirmation time nearest to the detection of the absence (S835). The subsequent processing contents (S836 and S837) are similar to those of S803 and S804 shown in FIG. 36 conditional to the confirmation of the in-zone of all users. As a result, all media data files before the oldest confirmation time are deleted including the contents of statements made by other users accumulated during the absence of the users.

What is claimed is:

1. A contents server including a processor to execute processes containing:
   recording media information transmitted from a plurality of users in a communicatable state, in which a user is able to communicate, participating in a predetermined group, for each group;
   detecting a communicatable state or an uncommunicatable state, in which a user is not able to communicate, of each participating user, at each predetermined time; and
   deleting, upon detecting that all the participating users are in the communicatable state, media information from media information already recorded in the recording process, by cooperating with a comparing process which compares an oldest confirmation time among final confirmation times of the users in a user state table with a file writing time in a media data file and requests the deleting process to delete all media data files written before the oldest confirmation time;
   extracting media information recorded during a period from when the user is in the uncommunicatable state, till when the user is in the communicatable state again, from the recording process, when the detecting process detects that the user in the uncommunicatable state enters the communicatable state again;
   transmitting media information extracted by the extracting process to only the user who has entered the communicatable state again; and
   presenting media information extracted by the extracting process to a user who has entered the communicatable state again to enable the user to select information, and making the user transmit only information selected by the user to the transmitting process.

2. The contents server according to claim 1, wherein
   the deleting deletes media information from the group from the recording, when none of the participating users participate in the group.

3. The contents server according to claim 2, wherein
   the deleting regards that a user is not participating in the group when the detecting detects that this user is in the uncommunicatable state, in which a user is not able to communicate, and also when this uncommunicatable state lasts for a predetermined period of time.

4. The contents server according to claim 1, wherein
   the detecting further detects a temporary uncommunicatable state, in which a user is not able to communicate, that a user in the communicatable state, in which a user is able to communicate, can personally set, and the temporary uncommunicatable state is processed in the same manner as that of the uncommunicatable state.

5. The contents server according to claim 1, further comprising a web control unit that provides additional services and options to the user.

6. The contents server according to claim 5, wherein
   additional services includes a selection of a participating group to the user, a selective transmission of stored media information, or a notification of a communicatable state, in which a user is able to communicate, and an uncommunicatable state, in which a user is not able to communicate.

7. The contents server according to claim 1, further comprising
   requesting a participation of another user in the participating group when the detecting detects the participating user.

8. The contents server according to claim 1, wherein
the contents server provides a PoC accumulation service or a teleconference service.

* * * * *